US012667770B2

(12) United States Patent
Ruiz et al.

(10) Patent No.: US 12,667,770 B2
(45) Date of Patent: Jun. 30, 2026

(54) METHOD AND SYSTEM FOR INTERACTIVE, INTERPRETABLE, AND IMPROVED MATCH AND PLAYER PERFORMANCE PREDICTIONS IN TEAM SPORTS

(71) Applicant: STATS LLC, Chicago, IL (US)

(72) Inventors: Hector Ruiz, Barcelona (ES); Sujoy Ganguly, Chicago, IL (US); Nathan Frank, Chicago, IL (US); Patrick Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 471 days.

(21) Appl. No.: 18/323,203

(22) Filed: May 24, 2023

(65) Prior Publication Data

US 2023/0381624 A1     Nov. 30, 2023

Related U.S. Application Data

(63) Continuation of application No. 16/254,088, filed on Jan. 22, 2019, now Pat. No. 11,660,521.

(Continued)

(51) Int. Cl.
*G06N 3/08*          (2023.01)
*A63B 71/06*         (2006.01)
(Continued)

(52) U.S. Cl.
CPC ...... *A63B 71/0605* (2013.01); *A63B 71/0622* (2013.01); *G06N 3/042* (2023.01);
(Continued)

(58) Field of Classification Search
CPC ............ A63B 71/0605; A63B 71/0622; A63B 71/0616; G06N 20/20; G06N 3/042; G06N 3/045; G06N 3/08
See application file for complete search history.

(56) References Cited

U.S. PATENT DOCUMENTS 6,616,529 B1     9/2003   Qian et al.
6,710,713 B1     3/2004   Russo
(Continued)

FOREIGN PATENT DOCUMENTS

CN          1386241 A     12/2002
CN          1708697 A     12/2005
(Continued)

OTHER PUBLICATIONS

Wei X., et al., "Modelling and Predicting Adversarial Behaviour Using Large Amounts of Spatiotemporal Data," A Thesis Submitted to the Science and Engineering Faculty of Queensland University of Technology, 2016, 164 Pages.
(Continued)

*Primary Examiner* — Gary Collins
(74) *Attorney, Agent, or Firm* — Bookoff McAndrews, PLLC

(57) ABSTRACT

A method of generating an outcome for a sporting event is disclosed herein. A computing system retrieves tracking data from a data store. The computing system generates a predictive model using a deep neural network. The one or more neural networks of the deep neural network generates one or more embeddings comprising team-specific information and agent-specific information based on the tracking data. The computing system selects, from the tracking data, one or more features related to a current context of the sporting event. The computing system learns, by the deep neural network, one or more likely outcomes of one or more sporting events. The computing system receives a pre-match lineup for the sporting event. The computing system generates, via the predictive model, a likely outcome of the sporting event based on historical information of each agent for the home team, each agent for the away team, and team-specific features.

20 Claims, 15 Drawing Sheets

100

Related U.S. Application Data

(60) Provisional application No. 62/619,894, filed on Jan. 21, 2018.

(51) Int. Cl.
  *G06N 3/042*    (2023.01)
  *G06N 3/045*    (2023.01)
  *G06N 20/20*    (2019.01)

(52) U.S. Cl.
  CPC .............. *G06N 3/045* (2023.01); *G06N 3/08* (2013.01); *G06N 20/20* (2019.01); *A63B 71/0616* (2013.01)

(56)         References Cited

U.S. PATENT DOCUMENTS

| | | | |
|---|---|---|---|
| 6,751,343 B1 | 6/2004 | Ferrell et al. | |
| 9,342,785 B2 | 5/2016 | Lucey et al. | |
| 9,442,933 B2 | 9/2016 | Tzoukermann et al. | |
| 10,201,752 B2 | 2/2019 | Lucey et al. | |
| 10,460,176 B2 | 10/2019 | Chang et al. | |
| 11,157,742 B2 | 10/2021 | Zhang et al. | |
| 11,182,806 B1 | 11/2021 | Arfa et al. | |
| 11,232,109 B1 | 1/2022 | Knoll et al. | |
| 2002/0165697 A1 | 11/2002 | Min | |
| 2004/0148275 A1 | 7/2004 | Achlioptas | |
| 2004/0148278 A1 | 7/2004 | Milo et al. | |
| 2005/0143198 A1 | 6/2005 | Charge | |
| 2006/0083304 A1 | 4/2006 | Pan et al. | |
| 2006/0149674 A1 | 7/2006 | Cook et al. | |
| 2006/0252476 A1 | 11/2006 | Bahou | |
| 2007/0293289 A1 | 12/2007 | Loeb | |
| 2008/0281444 A1* | 11/2008 | Krieger | A63F 13/12 700/91 |
| 2009/0186679 A1 | 7/2009 | Irvine et al. | |
| 2009/0203447 A2 | 8/2009 | Hansen et al. | |
| 2010/0129780 A1 | 5/2010 | Homsi et al. | |
| 2010/0184495 A1 | 7/2010 | Levy et al. | |
| 2010/0184563 A1 | 7/2010 | Molyneux et al. | |
| 2010/0283630 A1 | 11/2010 | Alonso | |
| 2010/0298958 A1 | 11/2010 | Connelly | |
| 2011/0013087 A1 | 1/2011 | House et al. | |
| 2011/0169959 A1 | 7/2011 | DeAngelis et al. | |
| 2011/0173235 A1 | 7/2011 | Aman et al. | |
| 2011/0267461 A1 | 11/2011 | Birenboim et al. | |
| 2012/0162435 A1 | 6/2012 | Elangovan et al. | |
| 2012/0214602 A1 | 8/2012 | Ahlstrom | |
| 2013/0104870 A1 | 5/2013 | Rizzo et al. | |
| 2013/0110271 A1 | 5/2013 | Fornell et al. | |
| 2013/0225271 A1 | 8/2013 | Amaitis | |
| 2013/0238106 A1 | 9/2013 | Ellis et al. | |
| 2013/0267328 A1 | 10/2013 | Heisler et al. | |
| 2014/0142921 A1 | 5/2014 | Gleadall et al. | |
| 2014/0143183 A1 | 5/2014 | Sigal et al. | |
| 2014/0206479 A1 | 7/2014 | Marty et al. | |
| 2014/0236331 A1 | 8/2014 | Lehmann et al. | |
| 2014/0274245 A1 | 9/2014 | Stickel | |
| 2014/0302914 A1 | 10/2014 | Weinstein et al. | |
| 2014/0309000 A1 | 10/2014 | Gustafson | |
| 2014/0364976 A1 | 12/2014 | Wohl et al. | |
| 2015/0031845 A1 | 1/2015 | McCauley et al. | |
| 2015/0058730 A1 | 2/2015 | Dubin et al. | |
| 2015/0131845 A1 | 5/2015 | Forouhar et al. | |
| 2015/0142716 A1 | 5/2015 | Lucey et al. | |
| 2015/0148129 A1 | 5/2015 | Austerlade et al. | |
| 2015/0248917 A1 | 9/2015 | Chang et al. | |
| 2015/0258416 A1 | 9/2015 | Ianni et al. | |
| 2015/0360134 A1 | 12/2015 | Rodriguez | |
| 2016/0007054 A1 | 1/2016 | Polumbus et al. | |
| 2016/0092769 A1* | 3/2016 | Lucey | G06N 7/01 706/47 |
| 2016/0096071 A1 | 4/2016 | Ianni et al. | |
| 2016/0182415 A1 | 6/2016 | Ames et al. | |
| 2016/0203279 A1 | 7/2016 | Srinivas et al. | |
| 2016/0220878 A1 | 8/2016 | Devathi | |
| 2016/0260015 A1 | 9/2016 | Lucey et al. | |
| 2016/0310850 A1* | 10/2016 | Covington | G06Q 50/34 |
| 2016/0375365 A1 | 12/2016 | Thompson et al. | |
| 2017/0043260 A1 | 2/2017 | Austerlade et al. | |
| 2017/0061314 A1 | 3/2017 | Schnurr et al. | |
| 2017/0072321 A1 | 3/2017 | Thompson et al. | |
| 2017/0080336 A1 | 3/2017 | Groset et al. | |
| 2017/0109015 A1 | 4/2017 | Krasadakis | |
| 2017/0132821 A1 | 5/2017 | Valliani et al. | |
| 2017/0165570 A1 | 6/2017 | Lucey et al. | |
| 2017/0166557 A1 | 6/2017 | Golden et al. | |
| 2017/0235848 A1 | 8/2017 | Van Dusen et al. | |
| 2017/0238055 A1 | 8/2017 | Chang et al. | |
| 2017/0246539 A1 | 8/2017 | Schwartz et al. | |
| 2017/0255830 A1 | 9/2017 | Chen | |
| 2017/0257653 A1 | 9/2017 | Farré Guiu et al. | |
| 2017/0259178 A1 | 9/2017 | Aghdaie et al. | |
| 2017/0291093 A1 | 10/2017 | Janssen | |
| 2017/0330029 A1 | 11/2017 | Turcot et al. | |
| 2018/0032858 A1 | 2/2018 | Lucey et al. | |
| 2018/0056124 A1 | 3/2018 | Marty et al. | |
| 2018/0084310 A1 | 3/2018 | Katz et al. | |
| 2018/0099201 A1 | 4/2018 | Marty et al. | |
| 2018/0137364 A1 | 5/2018 | Forouhar et al. | |
| 2018/0157974 A1 | 6/2018 | Carr et al. | |
| 2018/0158196 A1 | 6/2018 | Marks | |
| 2018/0204111 A1 | 7/2018 | Zadeh et al. | |
| 2018/0213033 A1 | 7/2018 | Subbian | |
| 2018/0218243 A1 | 8/2018 | Felsen et al. | |
| 2019/0087661 A1 | 3/2019 | Lee et al. | |
| 2019/0205652 A1 | 7/2019 | Ray et al. | |
| 2019/0221072 A1 | 7/2019 | Litman | |
| 2019/0224556 A1 | 7/2019 | Ruiz et al. | |
| 2019/0228290 A1 | 7/2019 | Ruiz et al. | |
| 2019/0228306 A1 | 7/2019 | Power et al. | |
| 2019/0251366 A1 | 8/2019 | Zhong et al. | |
| 2019/0374839 A1 | 12/2019 | Wanke et al. | |
| 2020/0004752 A1 | 1/2020 | Majumdar et al. | |
| 2020/0043287 A1 | 2/2020 | Zhang et al. | |
| 2020/0074181 A1 | 3/2020 | Chang et al. | |
| 2020/0170549 A1 | 6/2020 | Baykaner et al. | |
| 2020/0218902 A1 | 7/2020 | Chang et al. | |
| 2020/0230501 A1 | 7/2020 | Schwartz et al. | |
| 2020/0302181 A1 | 9/2020 | Bhanu et al. | |
| 2020/0336802 A1 | 10/2020 | Russell et al. | |
| 2020/0349611 A1 | 11/2020 | Publicover et al. | |
| 2020/0353311 A1 | 11/2020 | Ganguly et al. | |
| 2021/0056458 A1 | 2/2021 | Savova et al. | |
| 2021/0134124 A1 | 5/2021 | Srinivasan | |
| 2021/0142066 A1 | 5/2021 | Jayaram et al. | |
| 2021/0256265 A1 | 8/2021 | Gurpinar-Morgan et al. | |
| 2021/0272599 A1 | 9/2021 | Patterson et al. | |
| 2021/0304736 A1 | 9/2021 | Kothari et al. | |
| 2021/0383123 A1 | 12/2021 | Hobbs et al. | |
| 2021/0397846 A1 | 12/2021 | Chang et al. | |
| 2022/0055689 A1 | 2/2022 | Mandlekar et al. | |
| 2022/0067983 A1 | 3/2022 | Fidler et al. | |
| 2022/0253679 A1 | 8/2022 | Power et al. | |
| 2022/0270004 A1 | 8/2022 | Ruiz et al. | |
| 2022/0284311 A1 | 9/2022 | Haynes et al. | |

FOREIGN PATENT DOCUMENTS

| | | |
|---|---|---|
| CN | 102819749 A | 12/2012 |
| CN | 105833502 A | 8/2016 |
| KR | 100986647 B1 | 10/2010 |
| WO | 0122270 A2 | 3/2001 |
| WO | 2013166456 A2 | 11/2013 |
| WO | 2014008134 A1 | 1/2014 |
| WO | 2015076682 A1 | 5/2015 |
| WO | 2017031356 A1 | 2/2017 |

(56) References Cited

FOREIGN PATENT DOCUMENTS

| | | |
|---|---|---|
| WO | 2017161167 A1 | 9/2017 |
| WO | 2020010040 A1 | 1/2020 |

OTHER PUBLICATIONS

Wei X., etaL, "Predicting Serves in Tennis Using Style Priors," Proceedings of the 21th ACM SIGKDD International Conference on Knowledge Discovery and Data Mining, 2015, 9 pages.

Wei X., etaL, ""The Thin Edge of the Wedge": Accurately Predicting Shot Outcomes in Tennis Using Style and Context Priors," Proceedings of the 10th Annual MIT Sloan Sports Analytics Conference, Mar. 2016, 11 Pages.

Wright N., "Liverpool's Set-piece Problem Exposed in 3-3 Draw With Watford," Sky Sports, Aug. 12, 2017, 9Pages, Retrieved from URL: https://www.skysports.com/football/news/15117/10985307/liverpools-set-piece-problem-exposed-in-3-3-draw-with-watford, Dec. 8, 2017.

Yamaguchi K et al., "Who Are You With and Where Are You Going?," CVPR IEEE, 2011, 8 Pages.

Youtube: "Football Analytics using Deep Learning," Preferred Networks, Inc., Jul. 25, 2019, 3 Pages, XP005253004, [Retrieved on Apr. 28, 2020] Retrieved from URL: https://www.youtube.com/watch?v=hs_v3dv6OUL.

Yue Y., et al., "Learning Fine-Grained Spatial Models for Dynamic Sports Play Prediction," International Conference on Data Mining, IEEE, 2014, 10 Pages.

Zhao, "Research and Application of Online Learning of Formation Strategy Based on Neural Network, Information Technology Collection of China Masters Dissertations Full Text Database," 2014, No. 2, pp. 38-40, 07 pages.

Zhao Y., et al., "Applying Deep Bidirectional LSTM and Mixture Density Network for Basketball Trajectory Prediction," Optik, Science Direct, Apr. 2018, vol. 158, 17 Pages.

Zheng S., et al., "Generating Long-term Trajectories Using Deep Hierarchical Networks," Advances in Neural Information Processing Systems, 2016, 9 Pages.

Le H.M., et al., "Data-Driven Ghosting using Deep Imitation Learning," MIT Sloan Sports Analytics Conference, Mar. 3-4, 2017, 15 Pages.

Learned-Miller E.G., "Data Driven Image Models through Continuous Joint Alignment," IEEE Transactions on Pattern Analysis and Machine Intelligence, Feb. 2006, vol. 28, No. 2, pp. 236-250.

Lee N., et al., "Desire: Distant Future Prediction in Dynamic Scenes with Interacting Agents," Arxiv.org, Cornell University Library, 201 Olin Library Cornell University Ithaca, NY 14853, Apr. 14, 2017, 10 Pages, XP080763013, DOI: 10.1109/CVPR.2017.233.

Liang X., et al., "Dual Motion GAN for Future-Flow Embedded Video Prediction," Proceedings of the IEEE International Conference on Computer Vision, Aug. 3, 2017, 9 pages.

Lock D., et al., "Using Random Forests to Estimate Win Probability Before Each Play of an NFL Game," Journal of Quantitative Analysis in Sports, 2014, vol. 10, No. 2, pp. 197-205.

Lucey P., et al., "Quality vs Quantity: Improved Shot Prediction in Soccer using Strategic Features from Spatiotemporal Data," 9th Annual MIT Sloan Sports Analytics Conference, Feb. 27-28, 2015, 9 Pages.

Lucey P., et al., "Representing and Discovering Adversarial Team Behaviors Using Player Roles," Proceedings of the IEEE Conference on Computer Vision and Pattern Recognition, 2013, pp. 2706-2713.

Maher M.J., "Modelling Association Football Scores," Netherlandic Statistics, 1982, vol. 36, No. 3, pp. 109-118.

Maksai A., et al., "What Players Do With the Ball: A Physically Constrained Interaction Modeling," Proceedings of the IEEE Conference on Computer Vision and Pattern Recognition, 2016, pp. 972-981.

McCabe A., et al., "Artificial Intelligence in Sports Prediction," Fifth International Conference on Information Technology:New Generations, IEEE Computer society, Apr. 9, 2008, pp. 1194-1197, Retrieved from URL: https://ieeexplore.ieee.org/abstract/document/4492661, XP031244492.

Mehrotra K., et al., "Elements of Artificial Neural Networks," Massachusetts Institute of Technology, 1997, 351 pages.

Merhej C., et al., "What Happened Next? Using Deep Learning to Value Defensive Actions in Football Event-Data," ACM Symposium on Applied Perception 2020, ACMPUB27, New York, NY, USA , Aug. 14-18, 2021, pp. 3394-3403, DOI: 10.1145/3447548. 3467090, ISBN: 978-1-4503-8332-5, XP058612444, [Retrieved on Apr. 22, 2022], Retrieved from the URL: https://dl.acm.org/doi/pdf/10.1145/3447548.3467090.

Mikolov T., et al., "Distributed Representations of Words and Phrases and their Compositionality," Advances in Neural Information Processing Systems, 2013, 9 Pages.

Mikolov T., et al., "Efficient Estimation of Word Representations in Vector Space," arXiv:1301.3781v3, Sep. 7, 2013, 12 Pages.

Miller A., et al., "Factorized Point Process Intensities: A Spatial Analysis of Professional Basketball," International Conference on Machine Learning, arXiv:1401.0942v2, Jan. 8, 2014, 13 Pages.

Nakashima T., et al., "Off-Line Learning of Soccer Formations from Game Logs," World Automation Congress, 2010, 6 Pages.

Newton C., "How Youtube Perfected the Feed," The Verge, Aug. 30, 2017, pp. 1-8, [Retrieved on Apr. 17, 2020] Retrieved from URL: https://www.theverge.com/2017/8/30/16222850/youtube-google-brain-algorithm-video-recommendation-personalized-feed.

Nikolova M.H., et al., "The CD160+ CD8high Cytotoxic T Cell Subset Correlates with Response to HAART in HIV-1 + Patients," Cellular Immunology, Oct. 2005, vol. 237, No. 2, pp. 96-105.

Paine N., "The Pats' Comeback Was Incredible—Even If You Think the Falcons Blew It," FiveThirtyEight, Feb. 6, 2017, 4 pages, Retrieved from URL: https://fivethirtyeight.com/features/patriots-falcons-comeback-super-bowl.

Partial Supplementary European Search Report for European Application No. 16876628.5, mailed Aug. 14, 2019, 16 Pages.

Pathak D., et al., "Context Encoders: Feature Learning by Inpainting," Proceedings of the IEEE Conference on Computer Vision and Pattern Recognition, 2016, 12 Pages.

Pelechrinis K., "iWinRNFL: A Simple, Interpretable & Well-Calibrated In-Game Win Probability Model for NFL," arXiv preprint arXiv: 1704.00197, Mar. 14, 2018, 7 pages.

Peng Y., et al., "RASL: Robust Alignment by Sparse and Low-Rank Decomposition for Linearly Correlated Images," Pattern Analysis and Machine Intelligence, 2012, vol. 34, No. 11,8 Pages.

Perricone J., et al., "Predicting Results for Professional Basketball Using NBA API Data," 2016, 6 Pages.

Pettersson D., et al., "Football Match Prediction Using Deep Learning," Recurrent Neural Network Applications Master's Thesis in Computer Science—Algorithms, Languages and Logic, Jan. 1, 2017, 72 Pages, XP055923461, [Retrieved on May 20, 2022] Retrieved from URL: https://odr.chalmers.Se/bitstream/20.500.12380/250411/1/250411.pdf.

Pourmehr S., et al., "An Overview on Opponent Modeling in RoboCup Soccer Simulation 2D," Advances in Databases and Information Systems, Lecture Notes in Computer Science, Springer International Publishing, Berlin, Heidelberg, 2012, pp. 402-414, RoboCup 2011, ISBN 978-3-319-10403-4, XP047503722.

Power P., et al., "Not All Passes Are Created Equal: Objectively Measuring the Risk and Reward of Passes in Soccer From Tracking Data," Proceedings of the 23rd Association for Computing Machinery (ACM) Special Interest Group on Knowledge Discovery and Data Mining (SIGKDD) International Conference on Knowledge Discovery and Data Mining, Applied Data Science Paper, Aug. 13-17, 2017, pp. 1605-1613.

Pulling C., "Long Corner Kicks in the English Premier League: Deliveries Into the Goal Area and Critical Area," Kinesiology: International Journal of Fundamental and Applied Kinesiology, 2015, vol. 47, No. 2, pp. 193-201.

Ross L., et al., "Shortcomings in the Attribution Process: On the Origins and Maintenance of Erroneous Social Assessments," Cambridge University Press, 1982, pp. 129-152, 22 Pages.

Ruiz H., et al., ""The Leicester City Fairytale?": Utilizing New Soccer Analytics Tools to Compare Performance in the 15/16

(56) References Cited

OTHER PUBLICATIONS

& 16/17 EPL Seasons," Proceedings of the 23rd ACM SIG KDD International Conference on Knowledge Discovery and Data Mining, 2017, 13 Pages.

Schechtman-Rook A., "Introducing NFLWin: An Open Source Implementation of NFL Win Probability," PhD Football, Sep. 1, 2016, 4 pages, [Retrieved on Jan. 16, 2019] Retrieved from URL: http://phdfootball.blogspot.com/2016/09/introducing-nflwin-open-source.html.

Seidl T., et al., "Bhostgusters: Realtime Interactive Play Sketching With Synthesized NBA Defenses," Proceeding of the 12th MIT Sloan Sports Analytics Conference, 2018, pp. 1-13.

Sha L., et al., "Chalkboarding: A New Spatiotemporal Query Paradigm for Sports Play Retrieval," Proceedings of the 21st International Conference on Intelligent User Interfaces, Mar. 10, 2016, 12 Pages, XP058079652, [Retrieved on May 2, 2020] Retrieved from URL: https://dl.acm.org/doi/pdf/10.1145/2856767.2856772.

Sha L., et al., "Fine-Grained Retrieval of Sports Plays Using Tree-Based Alignment of Trajectories," arXiv preprint arXiv: 1710. 02255, Oct. 6, 2017, 10 pages, DOI: 10.1145/nnnnnnn.nnnnnnn, XP055839892, [Retrieved on Sep. 10, 2021] Retrieved from URL: https://arxiv.orgjpdf/1710.02255.pdf.

Sohn K., et al., "Learning Structured Output Representation Using Deep Conditional Generative Models," Advances in Neural Information Processing Systems, 2015, 9 pages.

Srinivas S., et al., "A Taxonomy of Deep Convolutional Neural Nets for Computer Vision," Published on Frontiers in Robotics and AI, Jan. 11, 2016, vol. 2, Article 36, pp. 1-13, [Retrieved on Mar. 18, 2018].

Stein M., et al., "Bring It to the Pitch: Combining Video and Movement Data to Enhance Team Sport Analysis," IEEE Transactions on Visualization and Computer Graphics, USA, Jan. 31, 2018, vol. 24, No. 1, pp. 13-22, DOI: 10.1109/TVCG.2017.2745181, ISSN: 1077-2626, XP011673894, (Dec. 4, 2017).

Su S., et al., "Social Behavior Prediction from First Person Videos," ArXiv preprint, arXiv:1611.09464, Nov. 29, 2016, pp. 1-10.

Tian C., et al., "Use of Machine Learning to Automate the Identification of Basketball Strategies Using Whole Team Player Tracking Data," Dec. 18, 2019, pp. 1-17, XP055968321, [Retrieved on May 31, 2022] Retrieved from URL: https://www.mdpi.com/2076-3417/10/1/24/html.

Trainor C., "Goalkeepers: How Repeatable are Shot Saving Performances?," Statsbomb, Oct. 21, 2014, 8 Pages, Retrieved from URL: https://statsbomb.com/2014/10/goalkeepers-how-repeatable-are-shot-saving-performances/.

Van Den Oord A., et al., "Pixel Recurrent Neural Networks," arXiv preprint arXiv: 1601.06759, Aug. 19, 2016, 11 Pages.

Van Den Oord A., et al., "WaveNet: A Generative Model for Raw Audio", arXiv Preprint, arXiv: 1609.03499v2, Sep. 19, 2016, 15 pages.

Van Der Maaten L., et al., "Visualizing Data Using t-SNE," Journal of Machine Learning Research, Nov. 2008, vol. 9, Revised Sep. 2008, pp. 2579-2605.

Wagenaar M., et al., "Using Deep Convolutional Neural Networks to Predict Goal-scoring Opportunities in Soccer," Proceedings of the 6th International Conference on Pattern Recognition Applications and Methods, Feb. 26, 2017, pp. 448-455, DOI: 10.5220/0006194804480455, ISBN 978-989-7582-22-6, XP055966011.

Wagenaar M., "Predicting Goal-Scoring Opportunities in Soccer by Using Deep Convolutional Neural Networks," Department of Artificial Intelligence, University of Groningen, Nov. 16, 2016, 65 Pages.

Walker J., et al., "An Uncertain Future: Forecasting From Static Images Using Variational Autoencoders," European Conference on Computer Vision, arXiv:1606.07873, Jun. 25, 2016, 17 pages.

Walters M., "Virgil van Dijk Transfer May Not Fix Liverpool's Dismal Defending of Set-pieces Warns Jurgen Klopp After Watford Woe," Aug. 13, 2017, 21 Pages, Retrieved from URL: https://www.mirror.co.uk/sport/football/news/liverpool-klopp-van-dijk-setpiece-10981217.

Wang K-C., et al., "Classifying NBA Offensive Plays Using Neural Networks," Proceedings of MIT Sloan Sports Analytics Conference, 2016, vol. 4, 9 Pages.

Wang S., et al., "Learning Optimal Parameters for Multi-target Tracking," International Journal of Computer Vision 122.3, 2017, 13 Pages.

Wei X., et aL, "Large-Scale Analysis of Formations in Soccer," Proceedings of the Digital Image Computing: Technqiues and Applications (DICTA), IEEE, Nov. 26, 2013, pp. 1-8, XP032536466, DOI: 10.1109/DICTA.2013.6691503.

Abdullah M.R., et al., "Intelligent Prediction of Soccer Technical Skill on Youth Soccer Player's Relative Performance Using Multivariate Analysis and Artificial Neural Network Techniques," International Journal on Advanced Science Engineering and Information Technology, Dec. 31, 2016, vol. 6, No. 5, 7 Pages, XP021196451, [Retrieved on Apr. 28, 2020] Retrieved from URL: https://s3.amazonaws.com/academia.edu.documents/50070619/Intelligent_Prediction_of_Soccer_Technical_Skill.df.

Abreu P.H., et al., "Improving a Simulated Soccer Team's Performance Through a Memory-Based Collaborative Filtering Approach," Applied Soft Computing, 2014, vol. 23, pp. 180-193.

Acuna D., "Unsupervised Modeling of the Movement of Basketball Players Using a Deep Generative Model," 31st Conference on Neural Information Processing Systems, Jan. 1, 2017, 11 pages, XP055839586, [Retrieved on Sep. 9, 2021] Retrieved from URL: http://www.cs.toronto.edu/-davidj/projects/unsupervised_modeling_using_a_DGM.pdf.

Akhter I., et al., "Bilinear Spatiotemporal Basis Models," ACM Transactions on Graphics, Apr. 2012, vol. 30, No. 2, Article 17, 12 Pages.

Alahi A., et al., "Social LSTM: Human Trajectory Prediction in Crowded Spaces," Proceedings of the IEEE Conference on Computer Vision and Pattern Recognition, 2016, pp. 961-971.

Alcorn M.A., "(Batter) Pitcher) 2vec: Statistic-Free Talent Modeling With Neural Player Embeddings," MIT Sloan, Sports Analytics Conference, 2018, pp. 1-12.

Al-Shboul R., et al., "Automated Player Selection for Sports Team using Competitive Neural Networks," International Journal of Advanced Computer Science and Applications, 2017, vol. 8, No. 8, pp. 457-460, XP055625443.

Anderson C., et al., "The Numbers Game: Why Everything You Know About Soccer is Wrong," Penguin Books, 2013, 116 Pages.

Arabzad S.M., et al., "Football Match Results Prediction Using Artificial Neural Networks; The Case of Iran Pro League," Journal of Applied Research on Industrial Engineering, Oct. 9, 2014, vol. 1, No. 3, pp. 159-179.

Asif M., et al., "In-play Forecasting of Win Probability in One-Day International Cricket: A Dynamic Logistic Regression Model," International Journal of Forecasting, 2016, vol. 32, pp. 34-43.

Bengio Y., et al., "A Neural Probabilistic Language Model," Journal of Machine Learning Research, 2003, vol. 3, pp. 1137-1155.

Beuoy M., "Updated NBA Win Probability Calculator," InPredictable, Feb. 6, 2015, 4 pages, [Retrieved on Jan. 16, 2019] Retrieved from URL: http://www.inpredictable.com/2015/02/updated-nba-win-probability-calculator.html.

Bialkowski A., et al., "Large-Scale Analysis of Soccer Matches using Spatiotemporal Tracking Data," IEEE International Conference on Data Mining, 2014, 7 pages.

Bishop C.M., "Mixture Density Networks," Neural Computing Research Group Report, NCRG/94/004, Feb. 1994, 26 pages.

Blaikie A.D., et al., "NFL & NCAA Football Prediction using Artificial Neural Networks," Proceedings of the Midstates Conference on Undergraduate Research in Computer Science and Mathematics, 2011, 8 Pages.

Blei D.M., et al., "Latent Dirichlet Allocation," Journal of Machine Learning Research, 2003, vol. 3, pp. 993-1022.

Boice J., "How Our Club Soccer Projections Work," FiveThirtyEight, Jan. 19, 2017, 6 pages, [Retrieved on Jan. 16, 2019] Retrieved from URL: https://fivethirtyeight.com/features/how-our-club- soccer-projections-work/.

Boshnakov G., etal., "A Bivariate Weibull Count Model for Forecasting Association Football Scores," International Journal of Forecasting, Sep. 9, 2016, 13 pages.

(56)            References Cited

OTHER PUBLICATIONS

Bowman S.R., et aL, "Generating Sentences from a Continuous Space," arXiv preprint arXiv: 1511.06349, May 12, 2016, 12 Pages.

Butt A.A., et aL, "Multi-Target Tracking by Lagrangian Relaxation to Min-Cost Network Flow," Proceedings of the IEEE Conference on Computer Vision and Pattern Recognition, 2013, 8 pages.

Carney M., et aL, "Predicting Probability Distributions for Surf Height Using an Ensemble of Mixture Density Networks," Proceedings of the Twenty-Second International Conference on Machine Learning, Bonn, Germany, Aug. 7, 2005-Aug. 11, 2005, Association for Computing Machinery, New York, Aug. 7, 2005, pp. 113-120, DOI: 10.1145/1102351.1102366, ISBN 978-1-59593-180-1, XP058203900.

Casal C.A., et aL, "Analysis of Corner Kick Success in Elite Football," International Journal of Performance Analysis in Sport, 2015, vol. 15, pp. 430-451.

Cervone D., et aL, "A Multiresolution Stochastic Process Model for Predicting Basketball Possession Outcomes," Journal of the American Statistical Association, Feb. 25, 2016, vol. 111, No. 514, pp. 585-599, 31 Pages.

Cervone D., et aL, "Pointwise: Predicting Points and Valuing Decisions in Real Time with NBA Optical Tracking Data," 8th Annual MIT Sloan Sports Analytics Conference, Feb. 28-Mar. 1, 2014, 9 Pages.

Chandler G., et aL, "An Exploratory Study of Minor League Baseball Statistics," Journal of Quantitative Analysis in Sports 8.4, 2012, 37 Pages.

Charles J., et aL, "Personalizing Human Video Pose Estimation," Proceedings of the IEEE Conference on Computer Vision and Pattern Recognition, Jun. 15, 2016, 14 Pages.

Chen J., et aL, "Learning Online Smooth Predictors for Realtime Camera Planning using Recurrent Decision Trees," Proceedings of the IEEE Conference on Computer Vision and Pattern Recognition, 2016, 14 pages.

Cheng H-T., et al., "Wide & Deep Learning for Recommender Systems," Proceedings of the 1st Workshop on Deep Learning for Recommender Systems, Sep. 2016, 4 Pages.

Chung J., et al., "Hierarchical Multiscale Recurrent Neural Networks," ICLR 2017, arXiv:1609.01704v7, dated Mar. 9, 2017, 13 Pages.

"Convolutional Neural Networks—Basics," Machine Learning Notebook, Apr. 7, 2017, 13 pages, [Retrieved on Mar. 18, 2022] Retrieved from URL: https://mlnotebook.github.io/post/CNN1.

Covington P., et aL, "Deep Neural Networks for YouTube Recommendations," Proceedings of the 10th ACM Conference on Recommender Systems, Sep. 2016, pp. 191-198.

Cox M., et aL, "Least Squares Congealing for Unsupervised Alignment of Images," Computer Vision and Pattern Recognition, 2008, 8 Pages.

Deerwester S., et aL, "Indexing by Latent Semantic Analysis," Journal of the American Society for Information Science, Sep. 1990, vol. 41, No. 6, 34 pages.

Deng Z., et aL, "Factorized Variational Autoencoders for Modeling Audience Reactions to Movies," Proceedings of the IEEE Conference on Computer Vision and Pattern Recognition, 2017, 10 Pages.

Dertat A., "Applied Deep Learning—Part 4: Convolutional Neural Networks," Towards Data Science, Nov. 8, 2017, 26 Pages, [Retrieved on Mar. 18, 2018] Retrieved from URL: https://towardsdatascience.com/applied-deep-learning-part-4-convolutional-neural-networks-584bc134c1e2.

Dinsdale D.R., et aL, "Interactive Gaming in Sports," U.S. Appl. No. 17/934,756, filed Sep. 23, 2022, 39 pages.

Dixon M.J., et aL, "Modelling Association Football Scores and Inefficiencies in the Football Betting Market," Applied Statistics, 1997, vol. 46. No. 2, pp. 265-280.

Dubow J., "San Antonio Spurs' Kawhi Leonard Ruled Out for Game 2 vs. Golden State Warriors," Associated Press, May 15, 2017, 4 pages, Retrieved from URL: http://www.nba.com/article/2017/05/15/san-antonio-spurs-kawhi-leonard-out-game-2.

Edge AI and Vision Alliance: "Using Convolutional Neural Networks for Image Recognition," Nov. 12, 2015, 20 Pages, [Retrieved on Mar. 18, 2018] Retrieved from URL: https://www.edge-ai-vision.com/2015/11/using-convolutional-neural-networks-for-image-recognition.

El-Far M., et al., "CD160 Isoforms and Regulation of CD4 and CD8 T-Cell Responses," Journal of Translational Medicine, 2014, vol. 12, No. 1, pp. 1-16.

ESPN Staff, "Neymar from Barca to PSG for 222m: Timeline of the World's Biggest Transfer," ESPN, Aug. 4, 2017, 18 Pages, Retrieved from URL: http://www.espn.com/soccer/blog/soccer-transfers/613/post/3170513/neymar-from-barcelona-to-psg-for-222m-euros-timeline-as-worlds-biggest-transfer-nears.

Examination Report No. 1 for Australian Patent Application No. 2022201634 dated Mar. 7, 2023, 4 Pages.

Extended European Search Report for European Application No. 16876628.5, mailed Jan. 29, 2020, 17 Pages.

Extended European Search Report for European Application No. 19740811.5, mailed Sep. 21, 2021, 10 Pages.

Extended European Search Report for European Application No. 19741311.5, mailed Sep. 15, 2021, 09 Pages.

Extended European Search Report for European Application No. 19741603.5, mailed Jun. 2, 2022, 11 Pages.

Extended European Search Report for European Application No. 19741793.4, mailed Jun. 28, 2022, 10 Pages.

Extended European Search Report for European Application No. 20765556.4, mailed Oct. 7, 2022, 12 Pages.

Felsen P., et al., "Body Shots: Analyzing Shooting Styles in the NBA Using Body Pose," MIT Sloan, Sports Analytics Conference, Mar. 2017, 11 Pages.

Felsen P., et al., "What will Happen Next? Forecasting Player Moves in Sports Videos," Proceedings of the IEEE International Conference on Computer Vision, 2017, pp. 3342-3351, DOI: 10.1109/ICCV.2017.362, XP033283205, [Retrieved on Dec. 22, 2017].

Extended European Search Report for Application No. 20801519.8, dated May 19, 2023, 7 pages.

Office Action for European Patent Application No. 20801519.8, mailed Jun. 6, 2023, 1 page.

Felsen P., et al., "Where Will They Go? Predicting Fine-Grained Adversarial Multi-agent Motion Using Conditional Variational Autoencoders," ICIAP: International Conference on Image Analysis and Processing, 17th International Conference, Naples, Italy, Lecture Notes in Computer Science, Oct. 6, 2018, pp. 761-776, Sep. 9-13, 2013, XP047488416, ISBN: 978-3-642-17318-9, [Retrieved on Oct. 6, 2018].

Frey B.J., et aL, "Clustering by Passing Messages Between Data Points," Science Magazine, Feb. 16, 2007, vol. 315, 06 pages.

Goddard J., et al., "Modelling Football Match Results and the Efficiency of Fixed-odds Betting," Working Paper, Department of Economics, Swansea University, 2004, 27 pages.

Graves A., "Generating Sequences with Recurrent Neural Networks," arXiv preprint arXiv: 1308.0850, Jun. 5, 2014, 43 pages.

Gregor K., et al., "DRAW: A Recurrent Neural Network for Image Generation," ArXiv preprint, arXiv: 1502.04623, May 20, 2015, 10 pages.

Gyarmati L., et al., "Searching for a Unique Style in Soccer", KDD Workshop on Large-Scale Sports Analytics, arXiv Preprint, arXiv: 1409.0308,2014, 4 Pages.

Hinton G.E., et al., "A Fast Learning Algorithm for Deep Belief Nets," Neural Computation, 2006, vol. 18, No. 7, pp. 1527-1554.

Ho T.K., "Random Decision Forests," Proceedings of 3rd International Conference on Document Analysis and Recognition, IEEE, 1995, vol. 1, pp. 278-282.

Huang E., et al., "Graph Analysis of Major League Soccer Networks: CS 224W Final Project," Stanford University, Dec. 9, 2018, pp. 1-9, XP055968318, [Retrieved on May 31, 2022] Retrieved from URL: http://snap.stanford.edu/ctass/cs224w-2018/reports/CS224W-2018-46.pdf.

Huang K-Y., et al., "A Neural Network Method for Prediction of 2006 World Cup Football Game," International Joint Conference on Neural Networks, IEEE, 2010, 8 pages.

(56)　　　　　References Cited

OTHER PUBLICATIONS

Hubacek O., et al., "Lifted Relational Team Embeddings for Predictive Sport Analytics," Jan. 1, 2018, 07 Pages, XP055923450, Retrieved from URL: http://ceur-ws.org/Vol-2206/paper7.pdf, (May 20, 2022).

Insafutdinov E., et al., "ArtTrack: Articulated Multi-Person Tracking in the Wild," Proceedings of the IEEE Conference on Computer Vision and Pattern Recognition, 2017, 9 Pages.

International Preliminary Report on Patentability for International Application No. PCT/US2016/066733, mailed Jun. 28, 2018, 9 Pages.

International Preliminary Report on Patentability for International Application No. PCT/US2019/014608, mailed Jul. 30, 2020, 10 Pages.

International Preliminary Report on Patentability for International Application No. PCT/US2019/014609, mailed Jul. 30, 2020, 08 Pages.

International Preliminary Report on Patentability for International Application No. PCT/US2019/014613, mailed Jul. 30, 2020, 07 Pages.

International Preliminary Report on Patentability for International Application No. PCT/US2019/014614, mailed Jul. 30, 2020, 6 Pages.

International Preliminary Report on Patentability for International Application No. PCT/US2020/020432, mailed Sep. 16, 2021, 10 Pages.

International Preliminary Report on Patentability for International Application No. PCT/US2020/032053, mailed Nov. 18, 2021, 08 Pages.

International Preliminary Report on Patentability for International Application No. PCT/US2021/016583, mailed Aug. 18, 2022, 11 Pages.

International Preliminary Report on Patentability for International Application No. PCT/US2021/034568 , mailed Dec. 15, 2022, 8 Pages.

International Preliminary Report on Patentability for the Application No. PCT/US2021/053117, mailed Apr. 13, 2023, 8 pages.

International Search Report and Written Opinion for International Application No. PCT/US2016/066733, mailed Apr. 17, 2017, 15 Pages.

International Search Report and Written Opinion for International Application No. PCT/US2019/014608, mailed Apr. 15, 2019, 11 Pages.

International Search Report and Written Opinion for International Application No. PCT/US2019/014609, mailed Apr. 12, 2019, 09 Pages.

International Search Report and Written Opinion for International Application No. PCT/US2019/014613, mailed Apr. 12, 2019, 08 Pages.

International Search Report and Written Opinion for International Application No. PCT/US2019/014614, mailed Apr. 16, 2019, 8 pages.

International Search Report and Written Opinion for International Application No. PCT/US2020/020432, mailed May 28, 2020, 11 Pages.

International Search Report and Written Opinion for International Application No. PCT/US2020/032053, mailed Sep. 29, 2020, 09 Pages.

International Search Report and Written Opinion for International Application No. PCT/US2021/016583, mailed Apr. 23, 2021, 12 Pages.

International Search Report and Written Opinion for International Application No. PCT/US2021/034568, mailed Aug. 25, 2021, 9 Pages.

International Search Report and Written Opinion for International Application No. PCT/US2021/053117, mailed Jan. 14, 2022, 9 Pages.

International Search Report and Written Opinion for International Application No. PCT/US2022/015240, mailed May 11, 2022, 7 Pages.

International Search Report and Written Opinion for International Application No. PCT/US2022/017229, mailed Jun. 9, 2022, 9 Pages.

International Search Report and Written Opinion for International Application No. PCT/US2022/018709, mailed Jun. 24, 2022, 11 Pages.

International Search Report and Written Opinion for International Application No. PCT/US2022/076934, mailed Dec. 13, 2022, 10 Pages.

International Search Report and Written Opinion for International Application No. PCT/US2022/077383, mailed Dec. 13, 2022, 15 Pages.

Jain A., et al., "Recurrent Neural Networks for Driver Activity Anticipation via Sensory-Fusion Architecture," IEEE International Conference on Robotics and Automation (ICRA), 2016, 8 Pages.

Janetzko H., et al., "Feature-Driven Visual Analytics of Soccer Data," Conference on Visual Analytics Science and Technology (Vast), IEEE, Oct. 25, 2014, pp. 13-22, DOI: 10.1109/VAST.2014. 7042477, XP032736904, [Retrieved on Feb. 13, 2015].

Ji B., et al., "NBA All-Star Lineup Prediction Based on Neural Networks," International Conference on Information Science And Cloud Computing Companion, IEEE, Dec. 7, 2013, pp. 864-869, DOI: 10.1109/ISCC-C.2013.92, XP032696737.

Kharrat T., et aL, "Plus-Minus Player Ratings for Soccer," arXiv preprint arXiv: 1706.04943, Jun. 16, 2017, 17 pages.

Kim K., et al., "Motion Fields to Predict Play Evolution in Dynamic Sport Scenes," IEEE Computer Society Conference on Computer Vision and Pattern Recognition, 2010, pp. 1-8.

Kingma D.P., et aL, "Adam: A Method for Stochastic Optimization," arXiv preprint arXiv:1412.6980, ICLR 2015, Jan. 30, 2017, 15 pages.

Kingma D.P., et aL, "Auto-Encoding Variational Bayes," ArXiv preprint, arXiv:1312.6114, May 1, 2014, 14 pages.

Kingma D.P., et al., "Semi-Supervised Learning with Deep Generative Models," Advances in Neural Information Processing Systems, Oct. 31, 2014, 9 Pages.

Kinoshita K., et al., "Deep Mixture Density Network for Statistical Model-based Feature Enhancement," IEEE International Conference on Acoustics, Speech and Signal Processing (ICASSP), Mar. 2017, pp. 251-255.

Knauf K., et al., "Spatio-Temporal Convolution Kernels," Machine Learning, Jul. 21, 2015, vol. 102, pp. 247-273, 28Pages, [Retrieved on Mar. 18, 2018] Retrieved from URL: https://www.researchgate. net/publication/279176268_Spatio- TemporalCon volutionKernels.

Koopman S.J., et al., "A Dynamic Bivariate Poisson Model for Analysing and Forecasting Match Results in the English Premier League," Journal of the Royal Statistical Society: Series A (Statistics in Society), Sep. 24, 2012, pp. 1-30.

Koren Y., et al., "Matrix Factorization Techniques for Recommender Systems," Computer, IEEE Computer Society, Aug. 2009, pp. 42-49, 8 Pages.

Le H.M., et al., "Coordinated Multi-agent Imitation Learning," In Proceedings of the 34th International Conference on Machine Learning, 2017, vol. 70, 13 Pages, JMLR.org, arXiv preprint arXiv: 1703.03121.

* cited by examiner

400

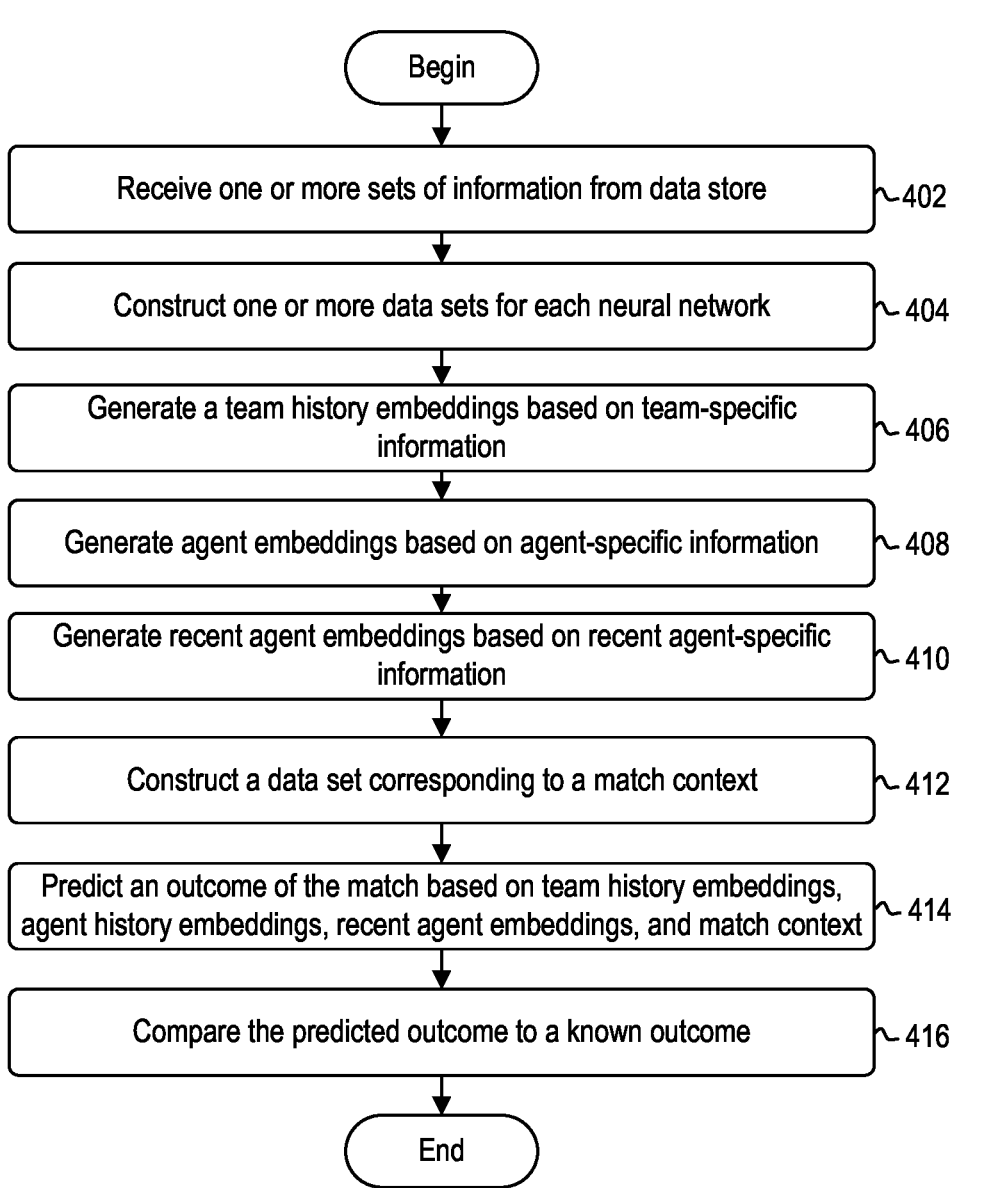

Begin

Receive one or more sets of information from data store    ~402

Construct one or more data sets for each neural network    ~404

Generate a team history embeddings based on team-specific information    ~406

Generate agent embeddings based on agent-specific information    ~408

Generate recent agent embeddings based on recent agent-specific information    ~410

Construct a data set corresponding to a match context    ~412

Predict an outcome of the match based on team history embeddings, agent history embeddings, recent agent embeddings, and match context    ~414

Compare the predicted outcome to a known outcome    ~416

End

Begin

Retrieve event data ~802

Construct a first vector representing team-specific stats ~804

Construct a second vector representing player-specific stats ~806

Construct a third vector representing play-by-play events ~808

Predict players currently on the court at every time, t ~810

Generate a predicted score ~812

Minimize the likelihood of finding the optimal set ~814

End

1000

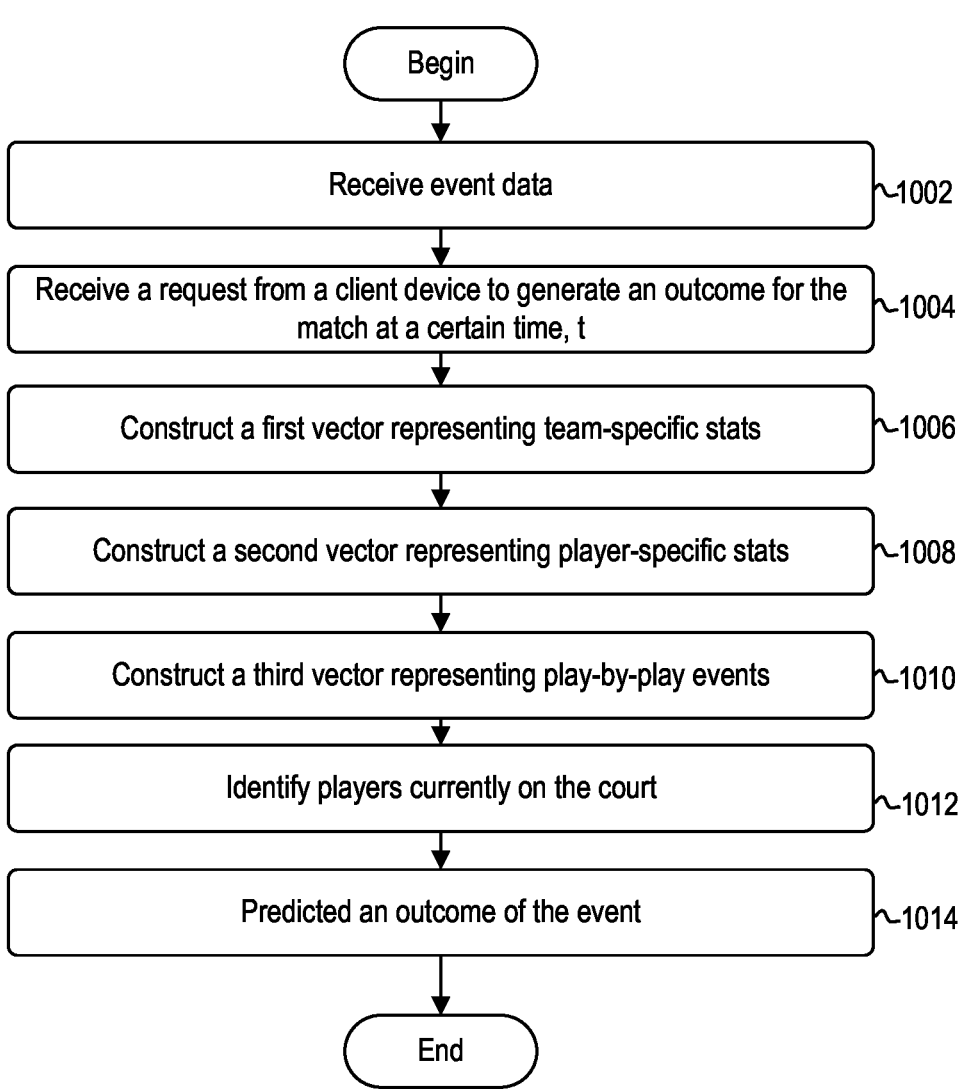

Begin

Receive event data ~1002

Receive a request from a client device to generate an outcome for the match at a certain time, t ~1004

Construct a first vector representing team-specific stats ~1006

Construct a second vector representing player-specific stats ~1008

Construct a third vector representing play-by-play events ~1010

Identify players currently on the court ~1012

Predicted an outcome of the event ~1014

End

FIG. 10

METHOD AND SYSTEM FOR INTERACTIVE, INTERPRETABLE, AND IMPROVED MATCH AND PLAYER PERFORMANCE PREDICTIONS IN TEAM SPORTS

CROSS-REFERENCE TO RELATED APPLICATIONS

This application is a continuation of U.S. patent application Ser. No. 16/254,088, filed Jan. 22, 2019, which claims priority to U.S. Provisional Application Ser. No. 62/619,894, filed Jan. 21, 2018, which are hereby incorporated by reference in their entireties.

FIELD OF THE DISCLOSURE

The present disclosure generally relates to system and method for generating a predictive model and, more specifically, a system and method for predicting pre-match and in-match outcomes.

BACKGROUND

Increasingly, sports fans and data analysts have become entrenched in sports analytics, particularly in predicting the outcome of a match both prior to initiation of the match and during match play. For example, leading up to a big match, sports networks continually host debate shows in which multiple parties argue over which team will win an upcoming match. Such analysis does not stop once the match ends, however. Typical "Monday Morning Quarterback" sportscasters argue over how the outcome of a match could have changed if, for example, the coach made one or more roster adjustments. Accordingly, there is a continual competition for developing a system that can more accurately predict an outcome of a sporting event.

SUMMARY

Embodiments disclosed herein generally relate to a system, method, and computer readable medium for generating an outcome for a sporting event is disclosed herein. A computing system retrieves event data from a data store. The event data includes play-by-play information for a plurality of events across a plurality of season. The computing system generates a predictive model using a deep neural network. The one or more neural networks of the deep neural network generate one or more embeddings comprising team-specific information and agent-specific information based on the event data. The computing system selects, from the event data, one or more features related to a current context of the sporting event. The computing system learns, by the deep neural network, one or more likely outcomes of one or more sporting events based at least on team-specific embeddings, agent-specific embeddings, and the current context of the sporting event. The computing system receives a pre-match lineup for the sporting event. The pre-match lineup includes a plurality of agents for a home team and a plurality of agents for an away team. The computing system generates, via the predictive model, a likely outcome of the sporting event based on historical information of each agent for the home team, each agent for the away team, and team-specific features.

In another embodiment, a system, method, and computer readable medium for generating an outcome for a sporting event. A computing system retrieves event data from a data store. The event data includes play-by-play information for a plurality of events across a plurality of season. The computing system generates a predictive model using a deep neural network. A neural network learns one or more players likely to be in each event at each time, t, given time based on lineup features of each team, current state of each event at each time t, and current box score at each time t. The computing system generates a data set that includes the one or more players likely to be in each event at each time t. A mixture density network learns a score difference at each time t, based on the lineup features of each team, the current state of each event at time t, the current box score at each time t, and the data set comprising the one or more players likely to be in each event at each time t. The computing system receives an indication to generate a predicted outcome of the sporting event at a current time, T. The computing system generates, via the predictive model, a final score differential for the sporting event based on lineup features of each team to the sporting event, current state of the sporting event at the time T, current box score at the time T, and current lineup in the sporting event at time T.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 4 is a flow diagram illustrating a method of training a deep neural network model, according to example embodiments.

FIG. 10 is a flow diagram illustrating a method of generating an in-game prediction of a sports event, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
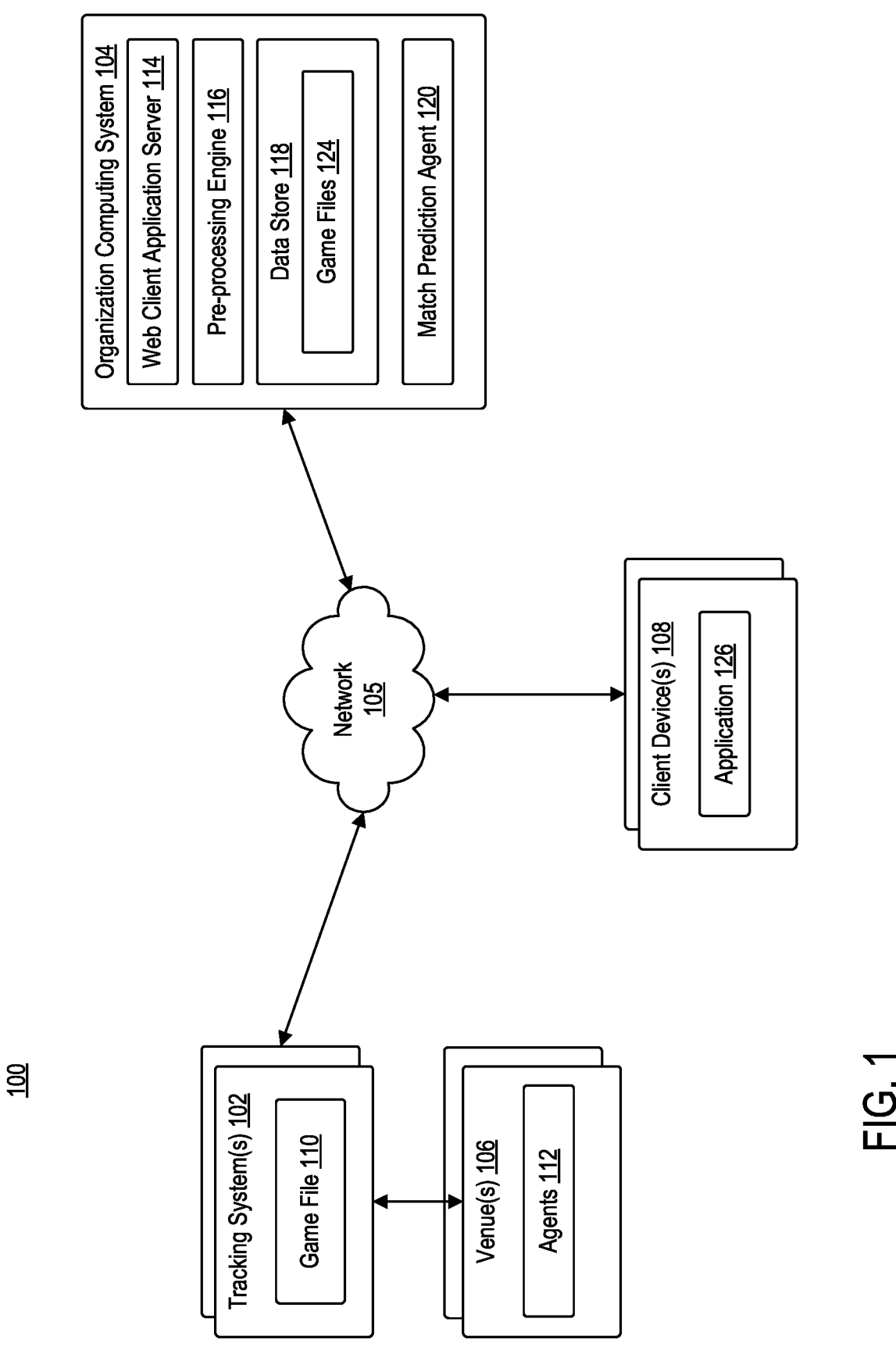
FIG. 1 is a block diagram illustrating a computing environment, according to example embodiments.

One or more techniques disclosed herein generally relate to a system and a method for generating predicted outcomes of a sporting event (e.g., "match"). For example, one or more techniques disclosed herein are directed to predicting the outcome of a match both prior to initiation of the match and during match play.

In some embodiments, one or more techniques disclosed herein generate a prediction model utilizing the power of personalized predictions to capture low-level non-linearities that exist between player performances within a team to generate a predicted outcome, prior to the match initiation. The rationale behind this approach, for example, is that agents and teams may have varying levels of talent, but their talent level, which they can display, may be intrinsically linked to other players on the field, as well as their opponents. Although this approach may be intuitive, it has proved extremely challenging to do this in practice due to the vast array of permutations that exist between players within and between teams. The one or more techniques described herein, however, are able to take advantage of lower-dimensional embeddings that capture these same interactions.

The one or more techniques described herein utilize the power of deep neural networks (i.e., multiple hidden layers) to identify these embeddings. Identification of these embeddings allow for (1) more accurate match prediction over conventional techniques; (2) data-driven player influence rankings; and (3) interactive "what-if" analysis, which may leverage the interpretability of the input feature space to compare players in specific situations.

The one or more techniques described herein are drastically different from current match-prediction models. For example, one or more techniques described herein explicitly encode the team lineup information in the feature representation. Such techniques stand in stark contrast to most other match-prediction models, which either forecast the number of goals being scored via a Poisson distribution with variables, which model the offensive and defensive capabilities, or estimate the win, draw, or loss directly. Conventional approaches also focus on "player ratings" estimate the number of goals/points a player can expect, but no conventional system explicitly predicts the outcome of the match—which, ultimately, is a superior label to use to correlate player performance.

Further, in some embodiments, the one or more techniques disclosed herein relate to in-match game prediction (i.e., after the match has started). Such techniques may allow the system described herein to dynamically generate match predictions, at any time during the match. As illustrated in the following example, conventional systems are unable to accurately predict match outcomes during the course of the game.

In Game 1 of the 2017 Western Conference Finals between the Golden State Warriors and the San Antonio Spurs, with 7:53 remaining in the third quarter and the Spurs up 78-55, Kawhi Leonard re-injured his left ankle while taking a jump-shot. Following Leonard's departure from the game, the Warriors went on an 18-0 run, eventually winning the game.

Intuition states that with Leonard off the court the Spurs are less likely to win; however, conventional approaches are unable to account for the severity of losing Leonard as well as the dominant previous performances of the Warriors over the past several seasons. Win probability models should be responsive to in-game contextual features such as injuries and fouls. Additionally, win probability models should incorporate team identity, i.e. team strength. Conventional systems fails to account for the Warriors' dominance in prior seasons and demonstrated ability to come back to win in similar situations should be captured by the model.

Further, conventional win probability models are limited in predicting the likelihood of a single, binary outcome given an in-game scenario. In reality, there are many paths to any one outcome, and the model should highlight this complexity. The fact that such issues are common in win probability estimates highlights a final problem. Still further, there simply remains no publicly available datasets or models against which researchers and analysts can compare information.

The one or more techniques described herein directly address the one or more limitations of conventional system by providing a system that addresses the issues of context and uncertainty through lineup encoding an explicit prediction of the score difference distribution (e.g., final score difference). For example, by using a mixture density network with lineup encoding, the one or more techniques described herein achieve levels of accuracy unattainable by conventional methods.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a game file 110.

Game file 110 may be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing engine 116, a data store 118, and match prediction agent 120. Each of pre-processing engine 116 and match prediction engine 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Match prediction agent 120 may be configured to generate "personalized predictions" for the outcome of a given match. In some embodiments, match prediction agent 120 may be configured to generate a predicted outcome of a given match, prior to initiation of the match (i.e., the match has not yet started). Accordingly, match prediction agent 120 may generate the predicted outcome based on a projected starting lineup for each team. In some embodiments, match prediction agent 120 may be configured to generate a predicted outcome of a given match, after initiation of the match (i.e., the match has started). Accordingly, match prediction agent 120 may be configured to predict, dynamically, the outcome of a match at any point t during the match. Match prediction agent 120 may utilize a deep learning framework that is trained to learn various team-specific attributes, player-specific attributes, and game context attributes to generate predicted outcomes.

Data store 118 may be configured to store one or more game files 124. Each game file 124 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may correspond to each play-by-play event in a particular match. In some embodiments, non-spatial event data may be derived from spatial event data. For example, pre-processing engine 116 may be configured to parse the spatial event data to derive play-by-play information. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

In some embodiments, each game file 124 may further include the home and away team box scores. For example, the home and away teams' box scores may include the number of team assists, fouls, rebounds (e.g., offensive, defensive, total), steals, and turnovers at each time, t, during gameplay. In some embodiments, each game file 124 may further include a player box score. For example, the player box score may include the number of player assists, fouls, rebounds, shot attempts, points, free-throw attempts, free-throws made, blocks, turnovers, minutes played, plus/minus metric, game started, and the like. Although the above metrics are discussed with respect to basketball, those skilled in the art readily understand that the specific metrics may change based on sport. For example, in soccer, the home and away teams' box scores may include shot attempts, assists, crosses, shots, and the like.

Pre-processing agent 116 may be configured to process data retrieved from data store 118. For example, pre-processing agent 116 may be configured to generate one or more sets of information that may be used to train one or more neural networks associated with pre-match module 202 and/or in-match module 204. Pre-processing agent 116 may scan each of the one or more game files stored in data store 118 to identify one or more statistics corresponding to each specified data set, and generate each data set accordingly. For example, pre-processing agent 116 may scan each of the one or more game files in data store 118 to identify a line-up of each team and the statistics associated with each player in the line-up.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 126. Application 126 may be representative of a web browser that allows access to a website or a stand-alone application. Client device 108 may access application 126 to access one or more functionalities of organization computing system 104. Client device 108 may communicate over network 105 to request a webpage, for example, from web client application server 114 of organization computing system 104. For example, client device 108 may be configured to execute application 126 to access content managed by web client application server 114. The content that is displayed to client device 108 may be transmitted from web client application server 114 to client device 108, and subsequently processed by application 126 for display through a graphical user interface (GUI) of client device 108.

Figure 2:
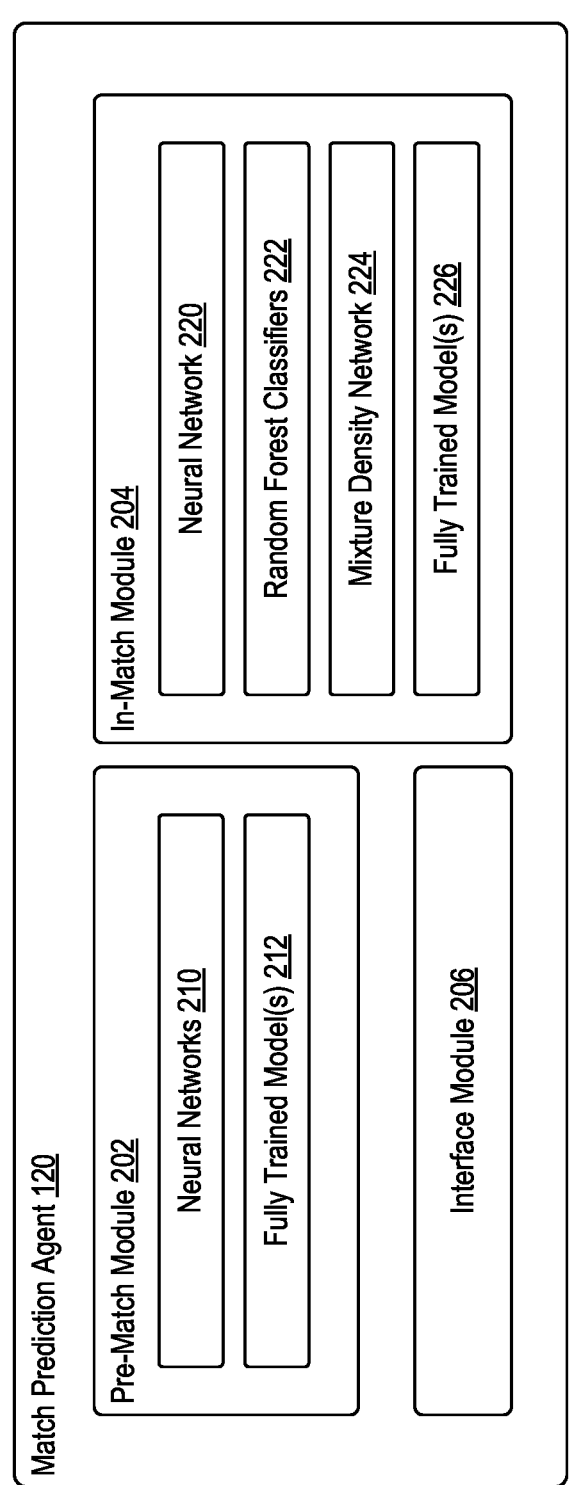
FIG. 2 is a block diagram illustrating a component of the computing environment of FIG. 1, according to example embodiments.

FIG. 2 illustrates match prediction agent 120 in greater detail, according to example embodiments. Match prediction agent 120 may include pre-match module 202, in-match module 204, and interface module 206.

Pre-match module 202 may be configured to predict an outcome of a match, prior to initiation of the match. At a high-level, pre-match module 202 may be configured to predict an outcome of a match based on, for example, a proposed starting lineup of the match. More specifically, pre-match module 202 may be configured to predict an outcome of a match based on, at least, team-specific embeddings, agent-specific embeddings, and match context. Pre-match module 202 may include at least one or more neural networks 210 and one or more fully trained models 212. Each neural network 210 may be configured to learn a specific embedding. For example, pre-match module 202 may include a first neural network to learn team history embeddings, a second neural network to learn agent embeddings, and a third neural network to learn recent agent embeddings. Such embeddings may be provided, as input, to a fourth neural network, which learns how to predict a match outcome based on, for example, team-specific information, player-specific information, and the match context. One or more fully trained models 212 may be generated as a result of a training process via one or more neural networks 210. For example, one or more fully trained models 212 may be used to predict match outcome and perform "what-if" analysis as a result of the training process.

In-match module 204 may be configured to predict an outcome of a match, after initiation of the match. For example, in-match module 204 may be configured to predict the outcome of the match during any point of the match. In-match module 204 may be able to predict the outcome of a match based on, for example, current game context, team history, and agent history. In-match module 204 may include neural network module 220, random forest classifier 222, mixture density network module 224, and one or more fully trained models 226.

Neural network module 220 may be configured to predict which agents are in an event (e.g., on the court) at a given time. For example, neural network module 220 may be configured to learn how to predict which agents are in an event based on team-specific information, player-specific information, and the current game state. In-match module 204 may train neural network module 220 with one or more sets of data from data store 118.

Random forest classifier 222 may be configured to aid in training neural network module 202. For example, in-match module 204 may train a set of random forest classifier models that use lineup encoding to report internal and external performance of the models. Random forest classifiers may be constructed using ensembles of decision tree classifiers. Decision trees may be configured to learn to make splits, i.e. infer rules, based upon values of the incoming observations in order to identify the value of target variables.

Mixture density network module 224 may be configured to generate a match prediction based on the predicted lineup from neural network module 202. For example, mixture density network may be configured to learn how to predict match outcomes based on the currently predicted lineup, agent-specific information, team specific information, and the current game state. In-match module 204 may train mixture density network module 224 with one or more sets of data from data store 118.

One or more fully trained models 212 may be generated as a result of a training process via one or more neural networks 220 and mixture density network 224. For example, one or more fully trained models 212 may be used to predict match outcome at any point during a match.

Pre-Match Prediction

Figure 3A:
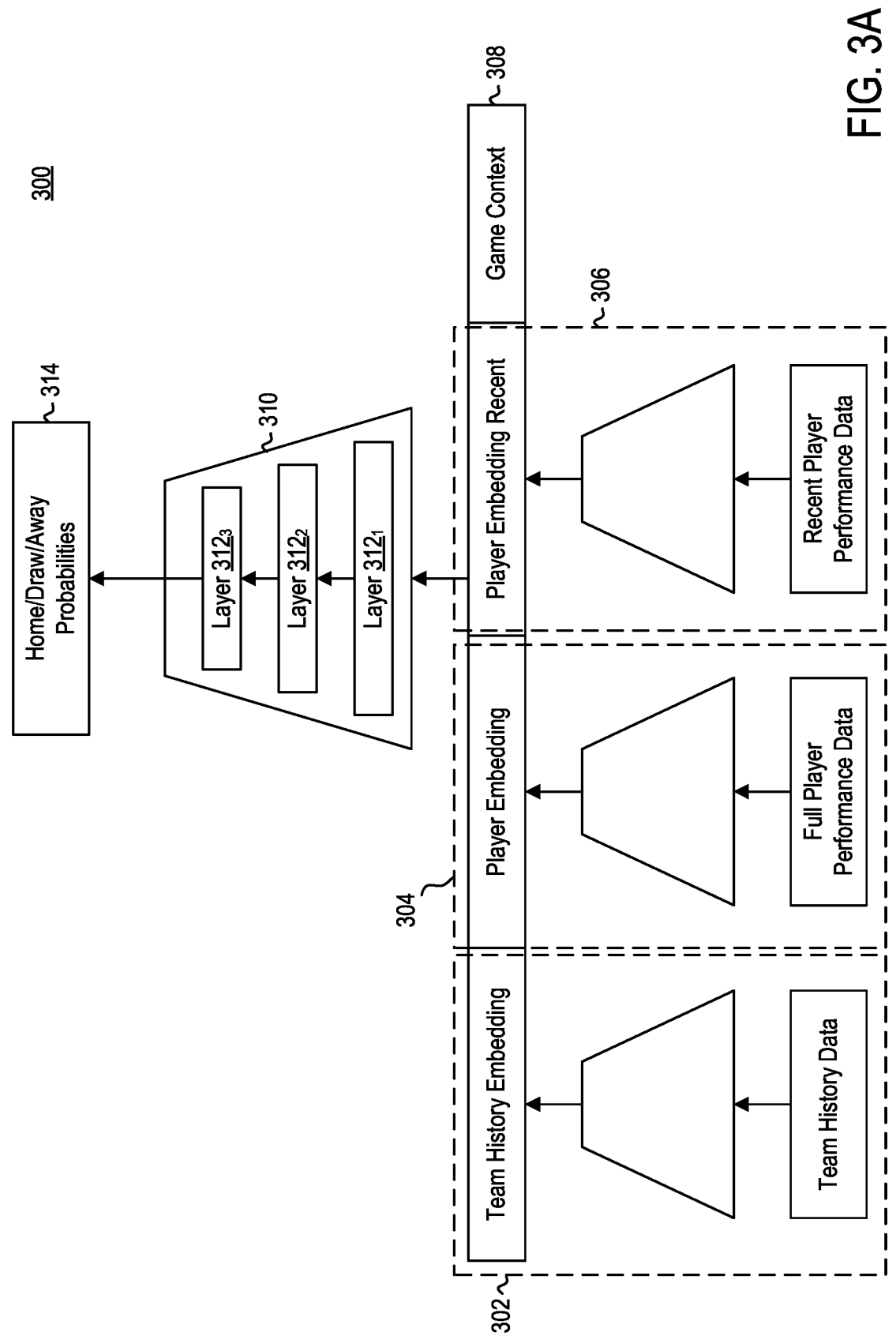
FIG. 3A is a block diagram illustrating a neural network architecture, according to example embodiments.

FIG. 3A is a block diagram illustrating a neural network architecture 300, according to example embodiments. As illustrated in FIG. 3A, several types of input features may be implemented with neural network architecture: team context input feature 302, full agent performance input 304, recent player performance input 306, and game context input 308.

Team context input may be generated based on a detailed breakdown of the previous performances that preceded the current match, for both teams. For example, for every game in data store 118, pre-match module 202 may select a subset of the most recent matches (e.g., last twenty matches) played by each of the two teams, ordered by date, aligned in pairs (e.g., most recent game by team A with most recent game by team B, second most recent game by team A with second most recent game by team B, etc.), and characterized by one or more features. Such features may include, but are not limited two:

atHomeA, atHomeB: binary variable to indicate whether the teams were playing at home in the previous fixture.

dataA, dataB: days from this previous match to the match to be predicted.

rankAopp, promotedAopp, relegatedAopp, rankBopp, promotedBopp, relegatedBopp: the ranking, promotion, and relegation indications of the teams each team (team A and team B) faced in the subset of most recent matches.

strengthDiffA, strengthDiffB: league strength difference between the teams and their previous opponents in the subset of most recent matches.

winA, drawA, lossA, winB, drawB, lossB: the results of each teams in each match in the subset of the most recent matches.

scoreA, scoreAopp, egvA, egvAopp, scoreB, scoreBopp, egvB, egvBopp: the number of goals (actual and expected) for each team and their opponents in the subset of most recent matches.

CAstyleA, STstyleA, HPstyleA, FTstyleA, DPstyleA, CRstyleA, CAstyleB, STstyleB, HPstyleB, FTstyleB, DPstyleB, CRstyleB: the playing style of each team and their opponents in the subset of most recent matches.

In some embodiments, these features may be derived from the outputs of a separate STATS framework, e.g., a playing style analysis tool for soccer. Each output may be defined as:

CAstyleA: an indicator of how much Counter Attack (CA) the home team played in the subset of most recent matches.

STstyleA: an indicator of how much Sustained Threat (ST) the home team played in the subset of most recent matches.

PstyleA: an indicator of how much High Press (HP) the home team played in the subset of most recent matches.

FTstyleA: an indicator of how much Fast Tempo (FT) the home team played in the subset of most recent matches.

DPstyleA: an indicator of how much Direct Play (DP) the home team played in the subset of most recent matches.

CRstyleA: an indicator of how much Crossing (CR) the home team played in the subset of most recent matches.

CAstyleB, STstyleB, etc. the away team counterpart for each of the above.

Counter Attack, Sustained Threat, High Press, Fast Tempo, Direct Play and Crossing are exemplary playing styles that may be measured.

Player context input may be generated based on one or more features that describes the starting lineups of each team involved in the match to be predicted. Each agent in the lineup may be characterized using their performance in previous appearances, each of which may be measured using the following indicators:

minutesPlayed: number of minutes played.

shots, goals, EGV: number of shots, goals, and EGV produced.

oBMP+, oBMP−, dBMP, dBMP−: scores for ball distribution (offensive) and ball disruption (defensive) produced.

passesMade, passesCompleted, passPCT, crossesMade, crossesCompleted, CrossPCT: number of passes and crosses made and completed, and completion percentage.

passesDefended, crossDefended, shotsBlocked: number of passes, crosses, and shots defended.

foulsMade, foulsReceived: number of fouls made and received.

saves, ESVFaced: (goalkeepers only) number of saves made, actual and expected.

on-pitchShotsOpp, on-pitchGoalsOPP, on-pitchEGVOpp: number of shots, gals, and EGV produced by the agent's opposition while on the pitch.

Recent player performance input may be representative of a subset of player performance input. For example, recent player performance input may be generated based on a subset of recent player matches (e.g., last five matches).

Game context input may be generated based on one or more features that capture the high-level context around a match to be predicted, thus providing a general overview of the recent (e.g., last five games) and more distant (e.g., previous season) team statistics. For example, game context input may include:

strengthDiff: the difference between the strength of the domestic league of the two teams. For example, this value may be non-zero in international competitions and zero in domestic competitions.

rankA, rankB: the final position of the teams in their previous season of the domestic league.

promotedA, promotedB, relegatedA, relegatedB: binary variables to indicate whether each team was promoted or relegated into the current season AGGpointsA, AGGscoreA, AGGscoreAopp, AGGpointsB, AGGscoreB, AGGscoreBopp: average points won, goals scored, and goals conceded. In some embodiments, this metric may be limited to recent team statistics (e.g., last five games).

Figure 3B:
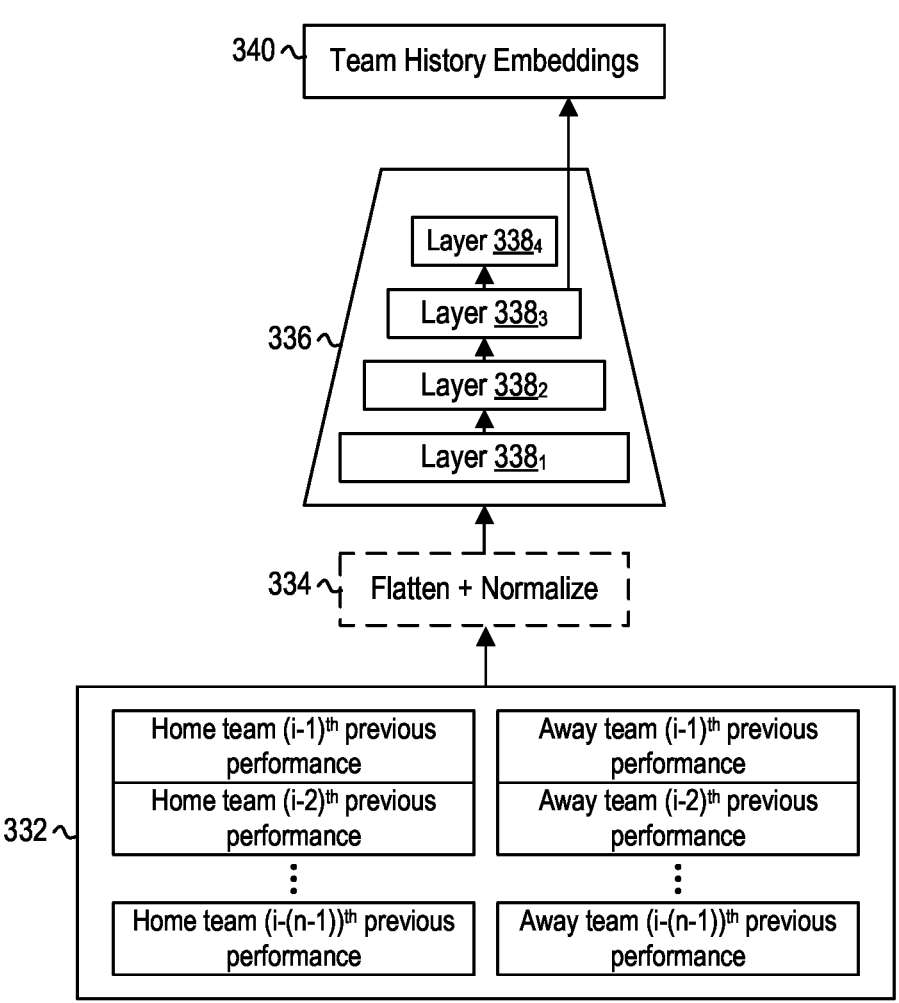
FIG. 3B is a block diagram illustrating a neural network architecture, according to example embodiments.
Figure 3C:
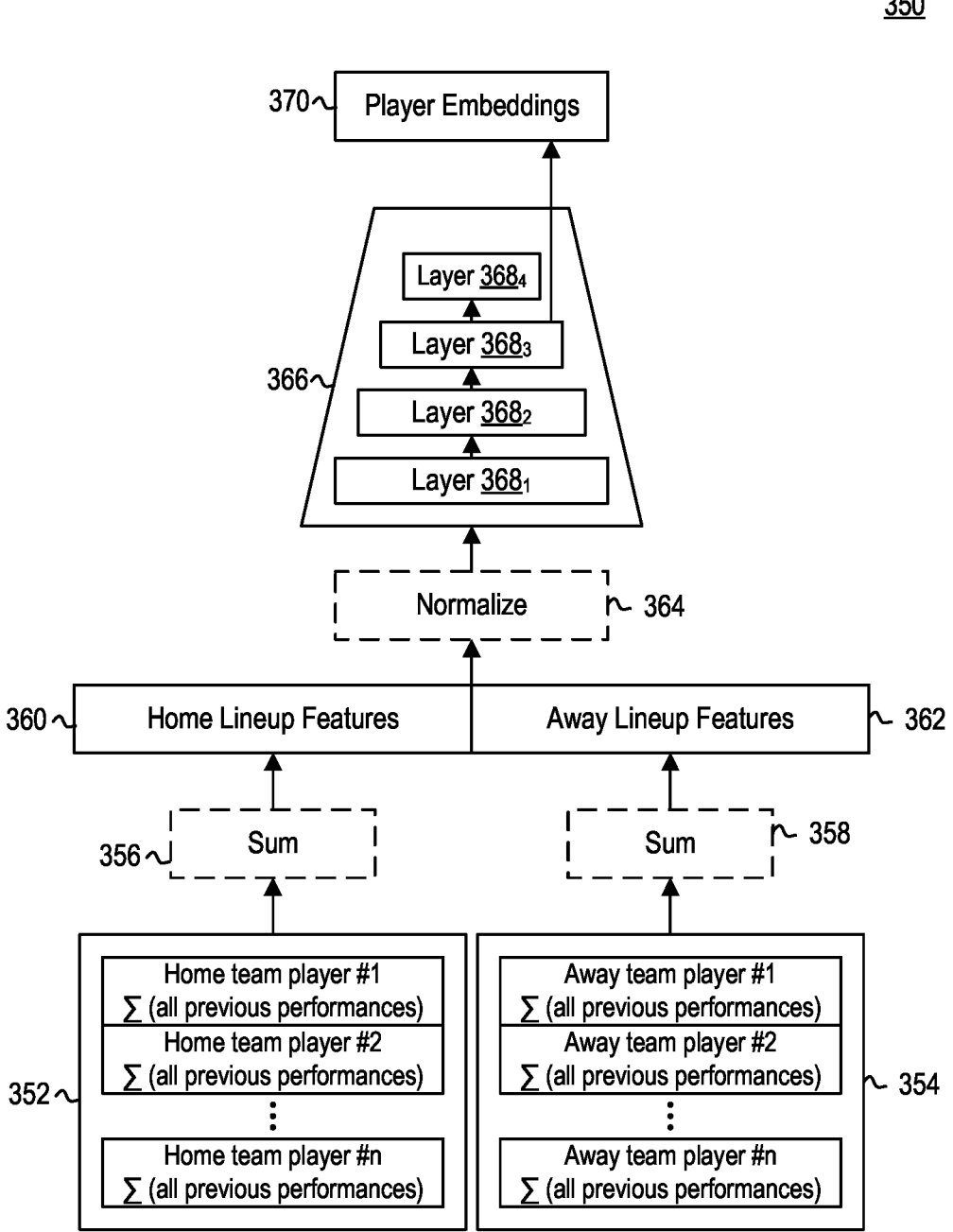
FIG. 3C is a block diagram illustrating a neural network architecture, according to example embodiments.
Figure 3D:
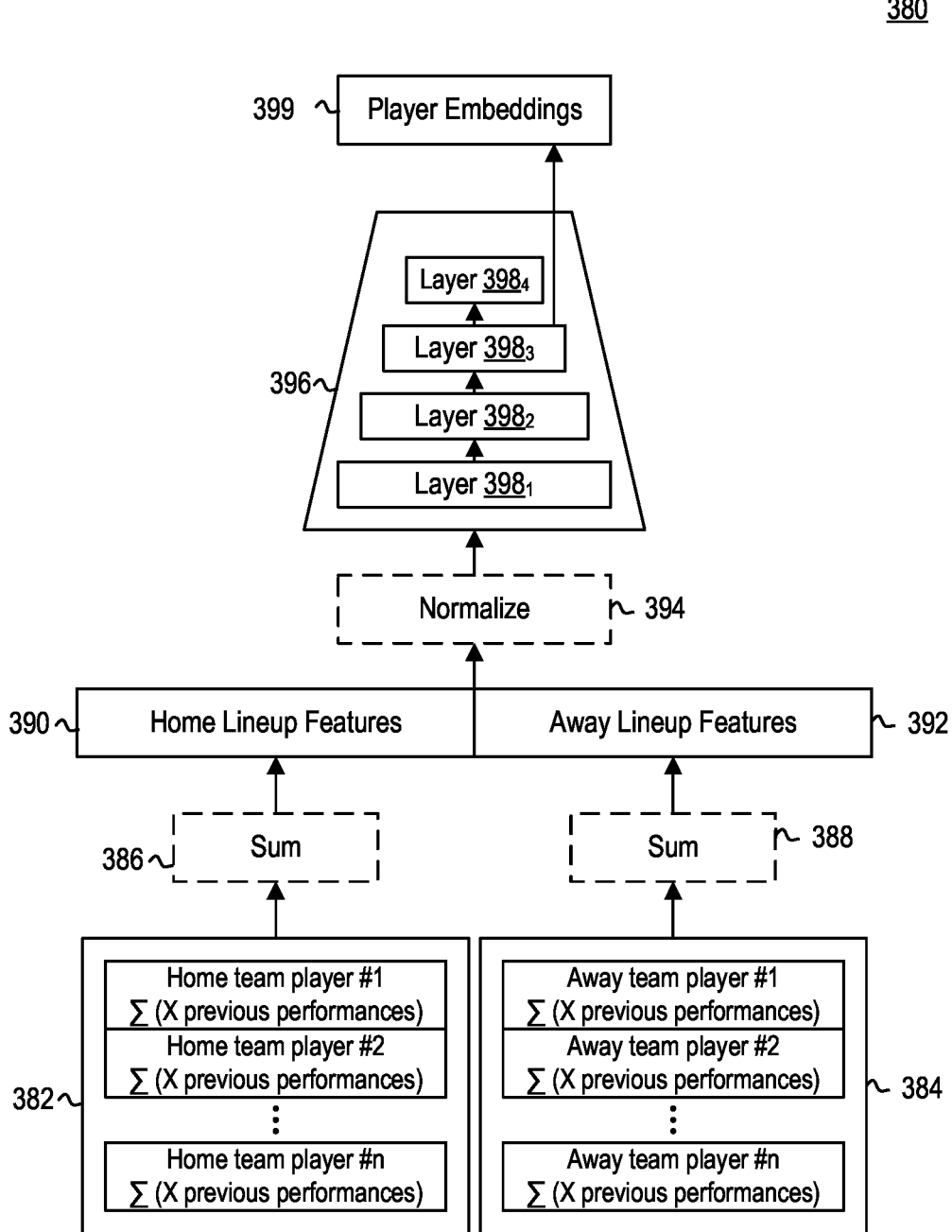
FIG. 3D is a block diagram illustrating a neural network architecture, according to example embodiments.

The groups of input features described above may represent a high dimensional space (e.g., about 900 inputs) for a model to be trained using thousands of examples. To simplify the learning process, pre-match module 202 may generate one or more embeddings having a lower dimension that the inputs alone. Each embedding may be generated using a separate fully-connected neural network, each of which is described below. For example, as illustrated team context embeddings may be generated via neural network 302, agent embeddings may be generated via neural network 304, and recent agent embeddings may be generated via neural network 306. FIGS. 3B-3D illustrate each neural network in greater detail below.

FIG. 3B is a block diagram illustrating a neural network architecture 330, according to example embodiments. Neural network architecture 330 may be used to generate team history embeddings. As illustrated, neural network architecture 330 may include input data 332, a data pre-processing module 334, a neural network 336, and output 340.

Input data 332 may include one or more sets of team history information. For example, input data 332 may include one or more sets of team history information that include the team context input data discussed above in conjunction with FIG. 3A. As illustrated, input data 332 may include team history information for both the home team and away team. Such information may include a pre-defined amount of matches for each team. For example, the data illustrated in input data 332 may include data from each teams' 20 previous performances.

Data pre-processing module 330 may be configured to process input data 332 prior to input to neural network 336. For example, data pre-processing module 330 may be configured to normalize input data 332. In some embodiments, data pre-processing module 330 may further be configured to flatten input data 332.

Pre-match module 202 may then train neural network 336 via the pre-processed team history information. Neural network 336 may include one or more layers $338_1$-$338_4$. One or more layers may include three hidden layers $338_1$-$338_3$. Layer $338_1$ may include 200 nodes; layer $338_2$ may include 40 nodes; and layer $338_3$ may include 15 nodes. Each layer $338_1$-$338_3$ may include rectified linear units as the activation function. Layer $338_4$ (i.e., the last layer in neural network 336) may be a linear layer.

Neural network 336 may be trained using a combination of mean square error and Adam optimization. The output from neural network 336 may be a set of embeddings directed to team history.

FIG. 3C is a block diagram illustrating a neural network architecture 350, according to example embodiments. Neural network architecture 350 may be used to generate agent embeddings. As illustrated, neural network architecture 350 may include input data 352, 354, data summation modules 356, 358 data pre-processing module 364, a neural network 366, and output 370.

Input data 352 may include one or more sets of agent information for each agent on the home team. For example, input data 352 may include one or more sets of agent information that include the agent context input data discussed above in conjunction with FIG. 3A. Such information may reflect all of the performances for each player. For example, input data 352 may include the summation of all performances for each home team agent 1-11.

Input data 354 may include one or more sets of agent information for each agent on the away team. For example, input data 354 may include one or more sets of agent information that include the agent context input data discussed above in conjunction with FIG. 3A. Such information may reflect all of the performances for each player. For example, input data 354 may include the summation of all performances for each away team agent 1-11.

Summation module 356 may be configured to sum (or aggregate) all of the values for each home team agent in input data 352. For example, summation module 356 may be configured to add together all of the values for each home team player, thus generating a single data set representing all agents of the home team. Accordingly, summation module 356 may output a set of home lineup features 360 representing one or more agents of the home team.

Summation module 358 may be configured to sum (or aggregate) all of the values for each away team agent in input data 354. For example, summation module 358 may be configured to add together all of the values for each away team player, thus generating a single data set representing all agents of the away team. Accordingly, summation module 358 may output a set of away lineup features 360 representing one or more agents of the away team.

Data pre-processing module 364 may be configured to process home lineup features 360 and away lineup features 362 prior to input to neural network 366. For example, data pre-processing module 360 may be configured to normalize the data sets corresponding to home lineup features 360 and away lineup features 362.

Pre-match module 202 may then train neural network 366 via the pre-processed home lineup features 360 and away lineup features 362. Neural network 366 may include one or more layers $368_1$-$368_4$. One or more layers may include three hidden layers $368_1$-$368_3$. Layer $368_1$ may include 200 nodes; layer $368_2$ may include 40 nodes; and layer $368_3$ may include 15 nodes. Each layer $368_1$-$368_3$ may include rectified linear units as the activation function. Layer $368_4$ (i.e., the last layer in neural network 366) may be a linear layer.

Neural network 366 may be trained using a combination of mean square error and Adam optimization. The Adam optimization algorithm is a method of tuning the parameters defining a neural network and is an extension of stochastic gradient descent. Optimization algorithms iteratively adjust the parameters of a neural network in order to generate predictions which best match the supplied examples. Adam optimization differs from classical gradient stochastic gradient descent in that it adapts the learning rate for each network parameter rather than using a fixed rate. Adam optimization is widely adopted in the machine learning community because it has demonstrated to achieve good results fast. The output from neural network 366 may be a set of embeddings directed to the one or more agents (i.e., 370).

FIG. 3D is a block diagram illustrating a neural network architecture 380, according to example embodiments. Neural network architecture 380 may be used to generate recent agent embeddings. As illustrated, neural network architecture 380 may include input data 382, 384, data summation modules 386, 388 data pre-processing module 394, a neural network 396, and output 399.

Input data 382 may include one or more sets of agent information for each agent on the home team. For example, input data 382 may include one or more sets of agent information that include the agent context input data discussed above in conjunction with FIG. 3A. Such information may reflect a subset of the most recent performances for each player on the home team. For example, input data 382 may include the summation of all performances for each home team agent 1-11 in the last five matches.

Input data 384 may include one or more sets of agent information for each agent on the away team. For example, input data 384 may include one or more sets of agent information that include the agent context input data discussed above in conjunction with FIG. 3A. Such information may reflect a subset of the most recent performances for each player on the away team. For example, input data 384 may include the summation of all performances for each away team agent 1-11 in the last five matches.

Summation module 386 may be configured to sum (or aggregate) all of the values for each home team agent in input data 382. For example, summation module 386 may be configured to add together all of the values for each home team player, thus generating a single data set representing all agents of the home team. Accordingly, summation module

386 may output a set of home lineup features 390 representing one or more agents of the home team.

Summation module 388 may be configured to sum (or aggregate) all of the values for each away team agent in input data 384. For example, summation module 388 may be configured to add together all of the values for each away team player, thus generating a single data set representing all agents of the away team. Accordingly, summation module 388 may output a set of away lineup features 390 representing one or more agents of the away team.

Data pre-processing module 394 may be configured to process home lineup features 390 and away lineup features 392 prior to input to neural network 396. For example, data pre-processing module 390 may be configured to normalize the data sets corresponding to home lineup features 390 and away lineup features 392.

Pre-match module 202 may then train neural network 396 via the pre-processed home lineup features 390 and away lineup features 392. Neural network 396 may include one or more layers $398_1$-$398_4$. One or more layers may include three hidden layers $398_1$-$398_3$. Layer $398_1$ may include 200 nodes; layer $398_2$ may include 40 nodes; and layer $398_3$ may include 15 nodes. Each layer $398_1$-$398_3$ may include rectified linear units as the activation function. Layer $398_4$ (i.e., the last layer in neural network 396) may be a linear layer.

Neural network 396 may be trained using a combination of mean square error and Adam optimization. The output from neural network 396 may be a set of embeddings directed to the recent performance of the one or more agents (i.e., 399).

The one or more embeddings may be able to perform nonlinear dimensionality reductions of the inputs, but supervised by an external target to ensure that the combination of inputs may be guided by a relevant criterion to the task at interest.

Referring back to FIG. 3A, as shown, the team embeddings 340, the agent embeddings 370, the recent agent embeddings 399, and game context 308 may be used as input to neural network 310. Neural network 310 may be a fully-connected neural network. Neural network 310 may include two hidden layers $312_1$ and $312_2$, followed by a softmax function $312_3$. Hidden layer $312_1$ may be of size 30; hidden layer $312_2$ may be of size 10. Each of hidden layer $312_1$, $312_2$ may use a rectifier linear unit function as its activation function. The final layer, $312_3$, may have three outputs, one per possible match outcome (home win, draw, away win), and one or more weights that were calculated by minimizing the average cross-entropy loss over the training data set. The output 314 may be a prediction for a given match (e.g., home win, draw, away win).

FIG. 4 is a flow diagram illustrating a method 400 of generating a prediction model for predicting pre-match outcomes, according to example embodiments. Method 400 may begin at step 402.

At step 402, pre-match module 202 may receive one or more sets of information from data store 118. Data store 118 may include spatial event data that captures every touch of the ball, with XY coordinates and time stamps as well as non-spatial event date, i.e., one or more variables describing the events occurring without associated spatial information. Accordingly, pre-match module 202 may be able to reconstruct games both in space and time, and therefore the ability to construct performance indicators of verifying complexity. Such performance indicators may include:

Traditional statistics: counts of passes, crosses and shots, as well as their outcome (completed/missed, saved/scored, etc.).

Playing styles: how a team play when in a particular possession. This may be assessed along a number of predefined styles, such as, but not limited to, direct play, counter attack, build up, fast tempo, and high press.

Expected metrics: the probability that a given shot is scored based on its characteristics. For example, to generate an expected goal value (EGV), the location of a shot, its type, and the characteristic of play preceding the shot may be used to obtain its (EGV).

Ball movement points: indicators of player performance from the point of view of ball distribution and disruption. Every player possession may be analyzed (e.g., start location, end location, and outcome) and a value may be assigned that estimates the value that it had for their teams. In some embodiments, this value may be positive for beneficial contributions, or negative for successful ones, and it is evaluated both offensively (oBMP) and defensively (dBMP).

At step 404, pre-match module 202 may construct one or more data sets for each neural network architecture. Pre-match module 202 may parse the received one or more sets of information to construct a first data set directed to team history features for neural network 336. Pre-match module 202 may parse the received one or more sets of information to construct a second data set directed to agent performance features for neural network 366. Pre-match module 202 may parse the received one or more sets of information to construct a third data set directed to agent performance features for neural network 396.

At step 406, pre-match module 202 may generate one or more team history embeddings based on team history features. For example, pre-match module 202 may implement neural network 336 to generate the one or more team history embeddings. Neural network 336 may take, as input, one or more metrics related to team history features. Such metrics may include, but are not limited to home team performance in a pre-defined number of events and away team performance in a pre-defined number of events. Such information may be used to train neural network 336 to generate the one or more team history embeddings.

At step 408, pre-match module 202 may generate one or more team agent embeddings based on agent performance features. For example, pre-match module 202 may implement neural network 366 to generate the one or more agent embeddings. Neural network 366 may take, as input, one or more metrics related to agent performance across all previous matches for each agent on each team. Such information may be used to train neural network 366 to generate the one or more team history embeddings.

At step 410, pre-match module 202 may generate one or more team recent agent embeddings based on recent agent performance features. For example, pre-match module 202 may implement neural network 396 to generate the one or more agent embeddings. Neural network 396 may take, as input, one or more metrics related to recent agent performance across a subset of the most recent matches for each agent on each team. For example, neural network 396 may receive, as input, one or more metrics related to agent performance in the last give matches. Such information may be used to train neural network 396 to generate the one or more recent team history embeddings.

At step 412, pre-match module 202 may generate a fourth data set related to game context features. For example, pre-match module 202 may parse the received one or more sets of information to construct to identify one or more features related to game context for use with neural network 310. Such features may include high-level context around each match to be predicted, thus providing a general idea of the recent (e.g., last five matches) and more distant (e.g., previous season) performances.

At step 414, pre-match module 202 may learn how to predict the outcome of a match based on team history embeddings, agent history embeddings, recent agent embeddings, and match context. For example, neural network 310 may be trained using a combination of team history embeddings, player embeddings, recent player embeddings, and game context as input. The weights of neural network 310 may be calculated by, for example, reducing (e.g., minimizing) the average cross-entropy loss over the data set.

At step 416, pre-match module 202 may compare the predicted outcome of each match to the actual outcome of each match. For example, trajectory agent 120 may utilize a cross-entropy loss and Adam optimizer to minimize the error between the inferred outcome (i.e., output from neural network 310) and the actual outcome (e.g., from data store 118).

Figures 5A, 5B:
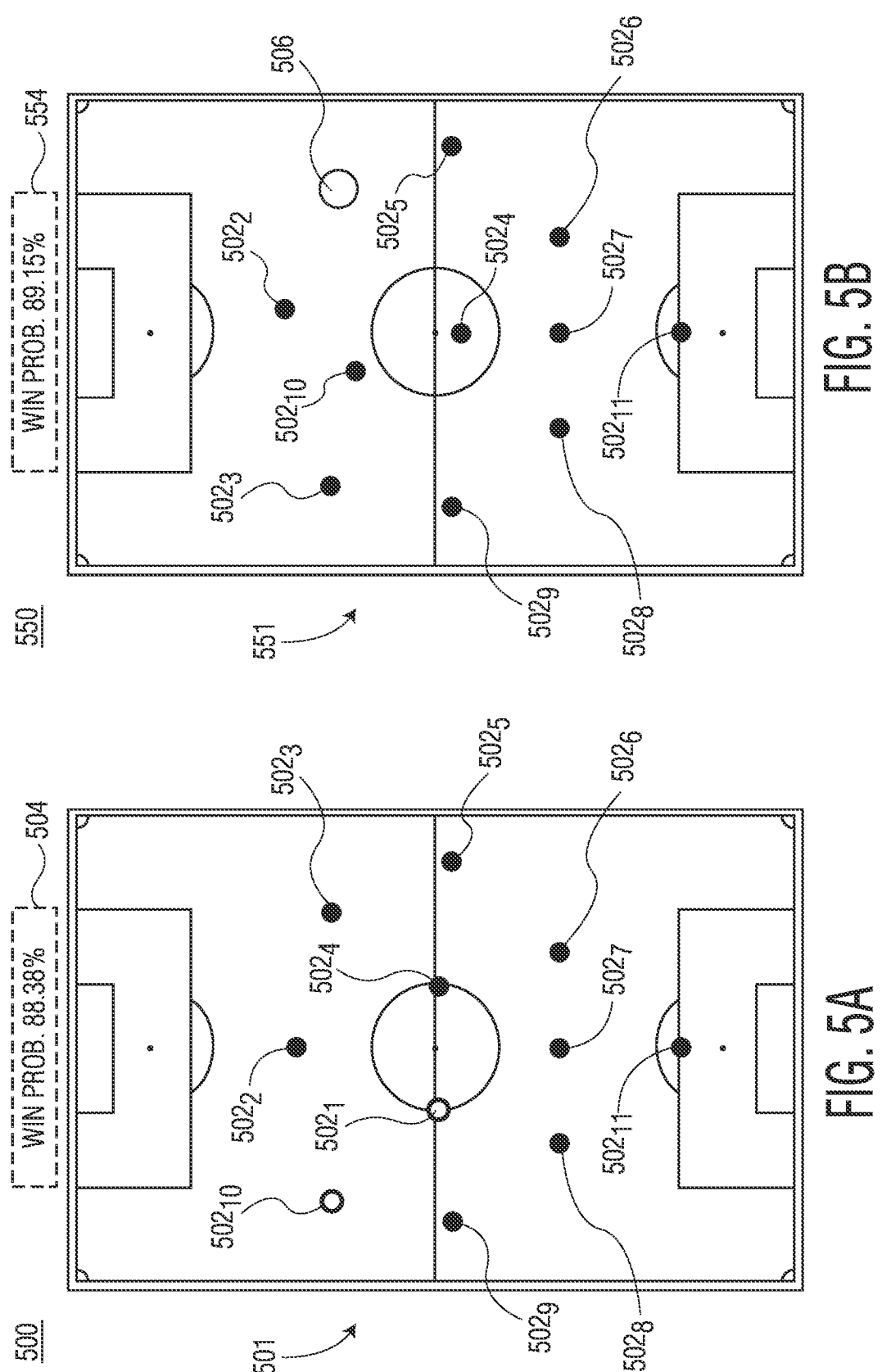
FIG. 5A is a block diagram illustrating a graphical user interface, according to example embodiments.
FIG. 5B is a block diagram illustrating a graphical user interface, according to example embodiments.

FIG. 5A is a block diagram illustrating a graphical user interface (GUI) 500, according to example embodiments. GUI 500 may be generated by interface module 206. In some embodiments, GUI 500 may be made available to one or more end users through application 126. In some embodiments, match prediction agent 120 may transmit GUI 500 to one or more client devices 106, via application 126, such that each client device 106 may render and display GUI 500.

GUI 500 may include a visual representation of a current starting lineup 501 for a team for a match. As illustrated, GUI 500 may include a visual representation of each agent $502_1$-$502_{11}$ (generally "agent 502") in the current starting lineup, as well as a predicted outcome 504 of an upcoming match based on this current starting lineup. Via GUI 500, end users may substitute an agent in the current starting lineup to generate a proposed starting lineup. For example, as illustrated, an end user may replace agent $502_1$ with a new agent 506.

FIG. 5B is a block diagram illustrating a graphical user interface (GUI) 550, according to example embodiments. GUI 550 may be generated by interface module 206 after a use substitutes an agent 502 in FIG. 5A with a new agent. In some embodiments, GUI 550 may be made available to one or more end users through application 126. In some embodiments, match prediction agent 120 may transmit GUI 550 to one or more client devices 106, via application 126, such that each client device 106 may render and display GUI 550.

When user replaces agent $502_1$ with new agent 506, match prediction agent 120 may generate a new predicted outcome based on an adjusted starting lineup 551. For example, match prediction agent 120 may parse the received input and may generate a new pre-match outcome prediction 554 based on the adjusted started lineup. Accordingly, interface agent 156 may generate an updated GUI 530 that reflects the adjusted starting lineup with an updated predicted outcome.

Figure 6:
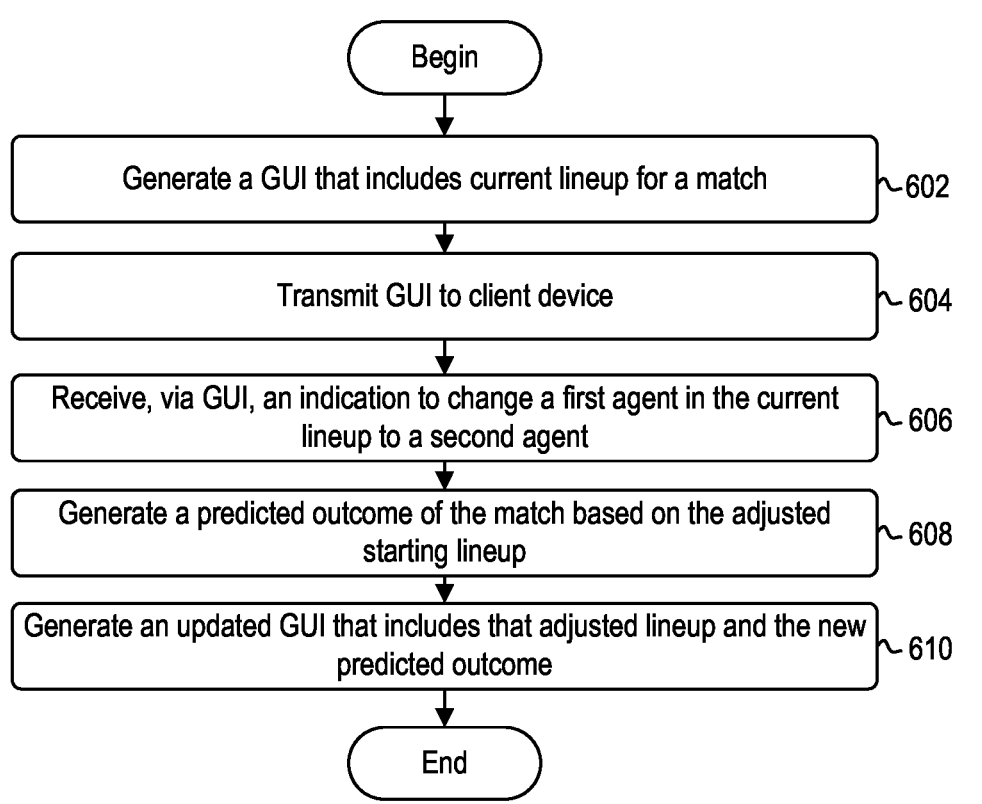
FIG. 6 is a flow diagram illustrating a method of predicting a pre-match outcome, according to example embodiments.

FIG. 6 is a flow diagram illustrating a method 600 of generating a pre-match prediction, according to example embodiments. Method 600 may begin at step 602.

At step 602, match prediction agent 120 may generate a graphical user interface that includes a current lineup for a team for a given match. For example, interface module 206 may generate GUI 500 that illustrates a current starting lineup for a particular match. Current starting lineup may include one or more agents that are selected to start the particular match.

At step 604, match prediction agent 120 may transmit GUI 500 to client device 106. For example, match prediction agent 120 may transmit GUI 500 to client device 106 via application 126 executing thereon. Client device 106 may receive GUI 500, render GUI 500, and display GUI 500 for one or more end users.

At step 606, match prediction agent 120 may receive, via GUI 500, an indication to change a first agent in the current lineup to a second agent. For example, match input agent may receive an indication to substitute agent $502_1$ for agent 506.

At step 608, in response to receiving the indication, match prediction agent 120 may generate a predicted outcome of the match, based on the adjusted starting lineup. For example, pre-match module 202 may leverage a prediction model to generate the predicted outcome of the event. In some embodiments, pre-match module 202 may gather team-specific information, agent specific information, and game context, and provide such information to a neural network represented by neural network architecture 300.

At step 610, match prediction agent 120 may update GUI 500 to include the generated predicted outcome. For example, interface module 206 may generate GUI 550 that includes graphical representations of the adjusted lineup and the new predicted outcome.

In-Match Prediction

As recited above, in-match module 204 may be configured to generalize personalized predictions for the outcome of a given match, during gameplay. For example, in-match module 204 may be configured to predict the outcome of a match, based on a combination of current game context, team context (both home and away), agent context (both home and away), and current agents in the match.

Figure 7A:
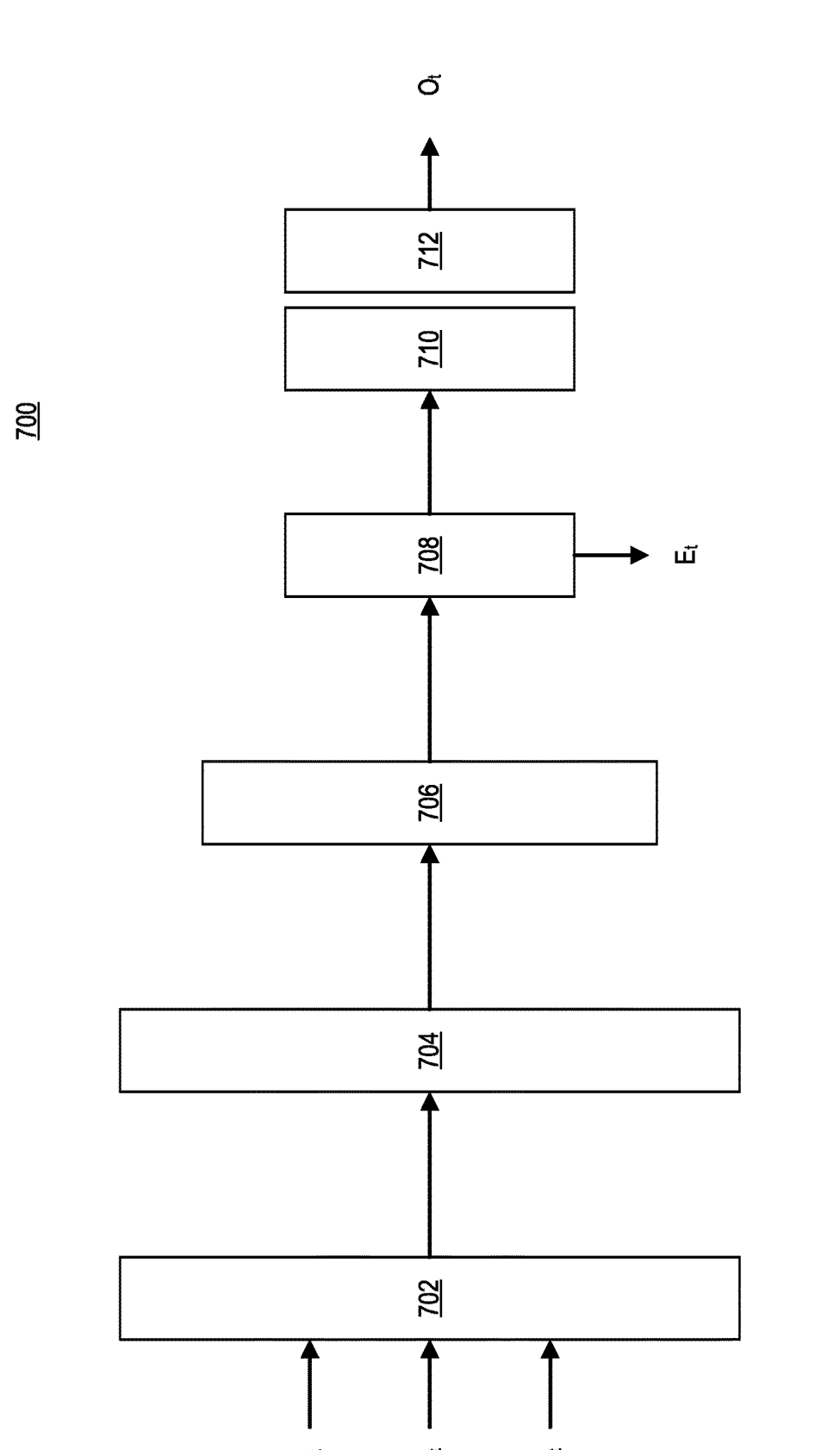
FIG. 7A is a block diagram of a structure of a neural network model, according to example embodiments.

FIG. 7A is a block diagram illustrating a neural network architecture 700 of neural network 220, according to example embodiments. Neural network architecture 700 may be used to predict the line-ups of each team that are currently in a match.

To train neural network 220, a data set may be generated. The data set may include data from over 8 million basketball play-by-play events over the course of several seasons. Each play-by-play event, $P_t$, may be described by game time, ball possession, and score differences, representing the base feature set. In some embodiments, the base feature set may be enhanced by the inclusion of home and away team identity, as well as event code (i.e., $P_t^+$).

As illustrated in FIG. 7A, $P_t$, $X_t$, and $L_t$ may be used as input to neural network 220. $X_t$ may represent the box scores for each of the home and away teams. For example, $X_t$ may represent each team's box score aggregated in the game up to the time t. Such information may include, but is not limited to, team assists, team blocks, team fouls, team rebounds (e.g., offensive, defensive, and total), team steals, team turnovers, and the like.

$L_t$ may represent each team's pre-game lineup for each game. For example, a lineup vector for each game $$\left(L_{i=\{H|A\}}^{j=\{0\ldots n\}}\right)$$

may be constructed for each player (j) on each team (i) and includes player identity, starter and availability flags, season to date games played, games started, minutes played, plus-minus, minutes per game, plus-minus per game, fouls per game, and the like. Team lineups may be formed from the union of n-such vectors, with padding of empty vectors (e.g., zeros) for rosters of less than n-players. $L_t$ may be the concatenation of home and away lineups.

Neural network 220 may be set with a task of predicting which players are on the court (e.g., $O_t$) at every game time, t, given the lineup features $L_t$, current game state $P_t$, and box score $X_t$.

Neural network 220 may include four fully connected encoding layers with ReLu activation. For example, neural network 220 may include a first layer 702 having 256 units, a second layer 704 having 256 units, a third layer 706 having 128 units, and a fourth layer 708 having 10 units. Although not shown, neural network 220 may include a dropout layer following each layer 704-708. The last encoding layer (i.e., fourth layer 708) may give the encoding features $E_t$ to be used by other models. Random forest classifiers 222 may be trained to use the encoding features, $E_t$, and report the internal and external performance of these models.

To predict $O_t$, neural network 220 may decode the encoded data with two fully connected layers with 15 units and ReLu activation (i.e., layer 210) and 30 units with sigmoid activation (e.g., layer 212), respectively. To train neural network 220, in-match module 204 may reduce (e.g., minimize) the cross-entropy via backpropagation using Adam optimization.

Because, in some embodiments (e.g., basketball), there are only ten valid on-court flags, in-match module may weight the cross-entropy to avoid the trivial solution of all agents being off the court.

Figure 7B:
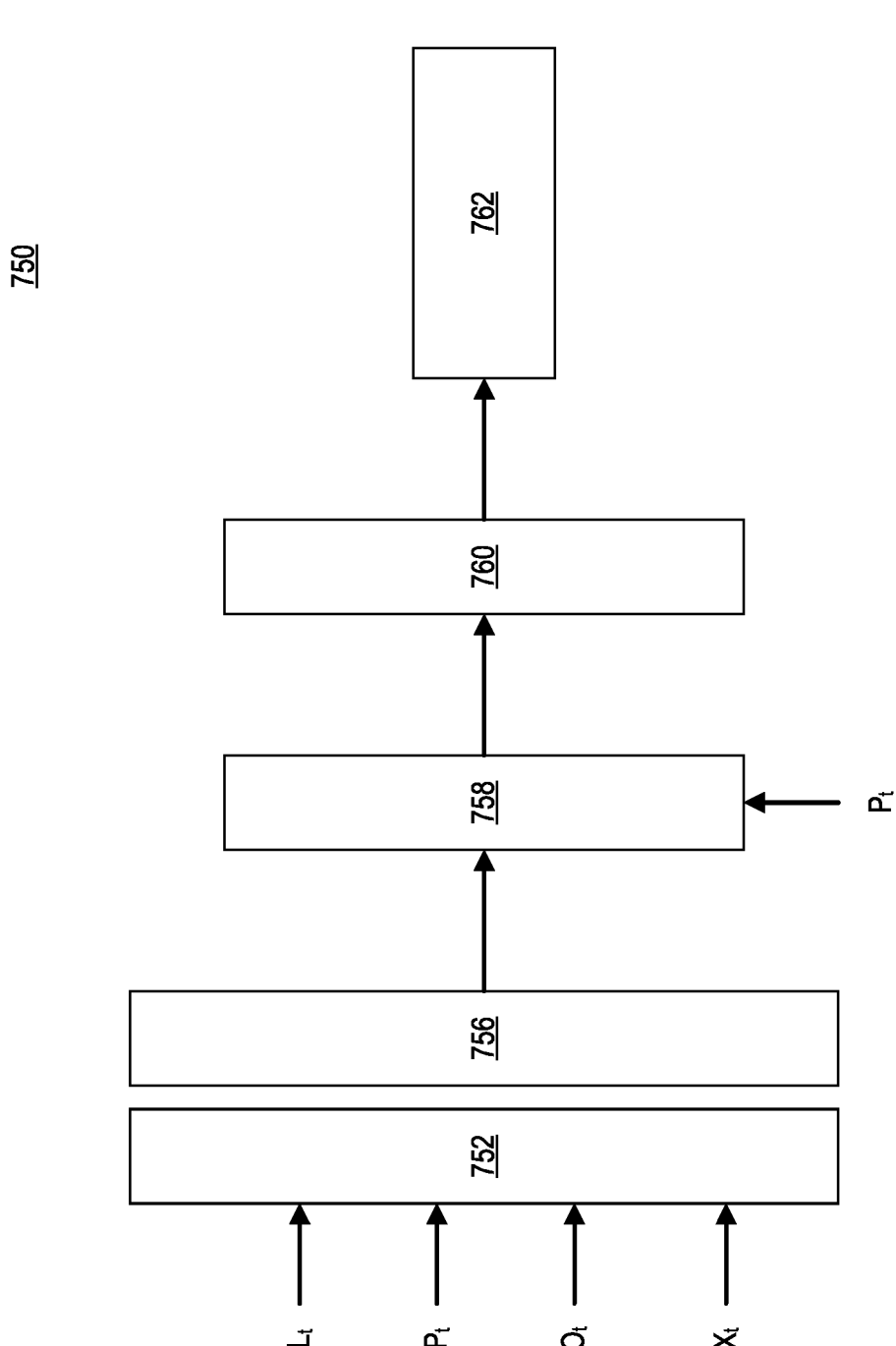
FIG. 7B is a block diagram illustrating a structure of a mixture density network, according to example embodiments.

FIG. 7B is a block diagram is a block diagram illustrating mixture density network architecture 750 of mixture density network 224, according to example embodiments. Mixture density network 224 may be trained to predict the score difference distribution (e.g., final score difference distribution) in a given match. Use of mixture density network 224 allows for use of a combination of neural network architectures and back propagation to find an optimal set of mixture parameters.

As shown, mixture density network 224 may receive, as input, $L_t$, $X_t$, $O_t$, and $P_t$. Mixture density network 224 may include a fully connected layer 752, a batch normalization layer 756, a dense layer 758, and an output layer 760. Fully connected layer 752 may have a tanh activation function and 128 units. Batch normalization layer 756 may be positioned at the output of fully connected layer 752. In-match module 204 may re-inject $P_t$ into mixture density network via dense layer 758. Dense layer 758 may be positioned at an output of batch normalization layer 756. Dense layer 758 may include a tanh activation function and 64 units. Following dense layer 758 may be output layer 760. Output layer 760 may include one or more linear activations.

Outputs from mixture density network 224 may be the parameters of a mixture of N=10 Gaussian distributions, such that the end of game score difference, $S_{t_f}$, may have a distribution of:

$$Q\left(s = S_{t_f}\right) = \sum_i^N \pi_i \mathcal{N}(\mu_i, \sigma_i)$$

where $\pi_i$ may be the weight of the $i^{th}$ distribution, and $\mu_i$ and $\sigma_i$ may be the mean and standard deviation of the $i^{th}$ Gaussian $\mathcal{N}$, respectively, and s=Home Team Score−Away Team Score. During training, in-match module 204 may reduce (e.g., minimize) the negative log likelihood, $-\log\{Q(s=S_{t_f})\}$, to find the optimal set of mixture parameters $\{\pi_i, \mu_i, \sigma_i\}$, $i \in [0, N]$.

Accordingly, rather than generate an output that provides a result that is home win, draw, away win, mixture density network 224 may be configured to generate a projected score difference between the away team and the home team. By predicting the score difference distribution, in-match module 204 may allow for the potential of various outcomes and measures of uncertainty. In other words, in-match module 204 may formulate the task of outcome prediction as a one (game state) to many (possible score differences) problem.

Figure 8:
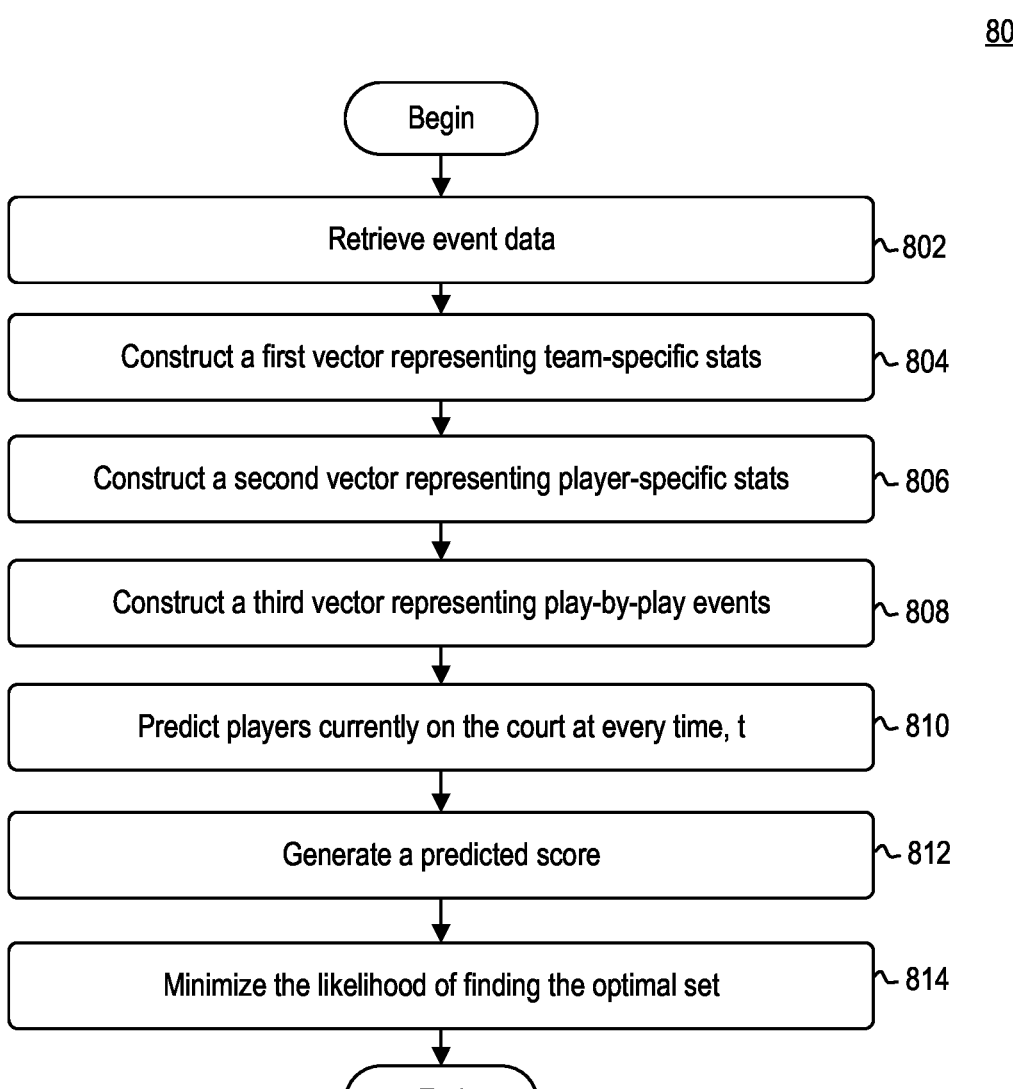
FIG. 8 is a flow diagram illustrating a method of training a deep neural network model, according to example embodiments.

FIG. 8 is a flow diagram illustrating a method 800 of generating a prediction model for predicting in-match outcomes, according to example embodiments. Method 800 may begin at step 802.

At step 802, in-match module 204 may receive one or more sets of information from data store 118. Data store 118 may include spatial event data that captures every touch of the ball, with XY coordinates and time stamps and non-spatial event data that captures one or more variables describing the events occurring without associated spatial information. For example, in-match module 204 may identify a data set for training the in-match prediction model. For example, in-match module 204 may compile a data set that includes over 8.7 million basketball play-by-play events from the 2002-03 through 2016-17 seasons.

At step 804, in-match module 204 may construct a first vector representing team-specific statistics. In-match module 204 may generate the first vector by parsing the one or more sets of information received from data store 118, and identifying those sets of information that are directed to team metrics. For example, in-match module 204 may construct a first vector, $X_t$, that includes each team's box score. Each team's box score may be aggregated up to a time, t, and includes team assists, team fouls, team rebounds (e.g., offensive, defensive, and total), team steals, and team turnovers.

At step 806, in-match module 204 may construct a second vector representing agent-specific statistics. In-match module 204 may generate the second vector by parsing the one or more sets of information received from data store 118, and identifying those sets of information that are directed to individual, agent metrics. In-match module 204 may construct a second vector, $L_t$, which may represent each team's in-game lineup for each game. For example, a lineup vector for each game $$\left(l_{i=\{H|A\}}^{j=\{0\dots n\}}\right)$$

may be constructed for each player (j) on each team (i) and includes player identity, starter and availability flags, season to date games played, games started, minutes played, plus-minus, minutes per game, plus-minus per game, fouls per game, and the like. Team lineups may be formed from the union of n-such vectors, with padding of empty vectors (e.g., zeros) for rosters of less than n-players. $L_t$ may be the concatenation of home and away lineups.

At step 808, in-match module 204 may construct a third vector representing one or more play-by-play events across all matches in the one or more sets of information. For example, in-match module 204 may generate a third vector, $P_t$, which includes one or more play-by-play events that may be described by game time, ball possession, and score differences, representing the base feature set. In some embodiments, the base feature set may be enhanced by the inclusion of home and away team identity, as well as event code (i.e., $P_t^+$).

At step 810, in-match module 204 may predict one or more players current in the match (e.g., on the court) at each time, t. In-match module 204 may train neural network 220 to predict the one or more players currently in the match. For example, neural network 220 may be set with a task of predicting which players are on the court (e.g., $O_t$) at every game time, t, given the lineup features $L_t$, current game state $P_t$, and box score $X_t$. To train neural network 220, in-match module 204 may reduce (e.g., minimize) the cross-entropy via backpropagation using Adam optimization. Accordingly, the output from neural network 220 may be the vector, $O_t$, that represents the one or more agents in the match, for both teams, at each time, t.

At step 812, In-match module 204 may generate a predicted final score for each match at each time, t. In-match module 204 may train mixture density network 224 to predict the score difference distribution in a given match. Use of mixture density network 224 allows for use of a combination of neural network architectures and back propagation to find an optimal set of mixture parameters. Mixture density network 224 may receive, as input, $L_t$, $X_t$, $O_t$, and $P_t$. Accordingly, the output from mixture density network 224 may be one or more sets of score differentials during each time, t, of each match.

At step 814, in-match module 204 may reduce (or minimize) the likelihood of finding the optimal set. Outputs from mixture density network 224 may be the parameters of a mixture of N=10 Gaussian distributions, such that the end of game score difference, $S_{t_f}$, may have a distribution of:

$$Q\left(s = S_{t_f}\right) = \sum_i^N \pi_i \mathcal{N}(\mu_i, \sigma_i)$$

where $\pi_i$ may be the weight of the $i^{th}$ distribution, and $\mu_i$ and $\sigma_i$ may be the mean and standard deviation of the $i^{th}$ Gaussian $\mathcal{N}$, respectively, and s=Home Team Score−Away Team Score. During training, in-match module 204 may reduce (e.g., minimize) the negative log likelihood, $-\log \{Q (s=S_{t_f})\}$, to find the optimal set of mixture parameters $\{\pi_i, \mu_i, \sigma_i\}$, $i \in [0, N]$.

Figure 9:
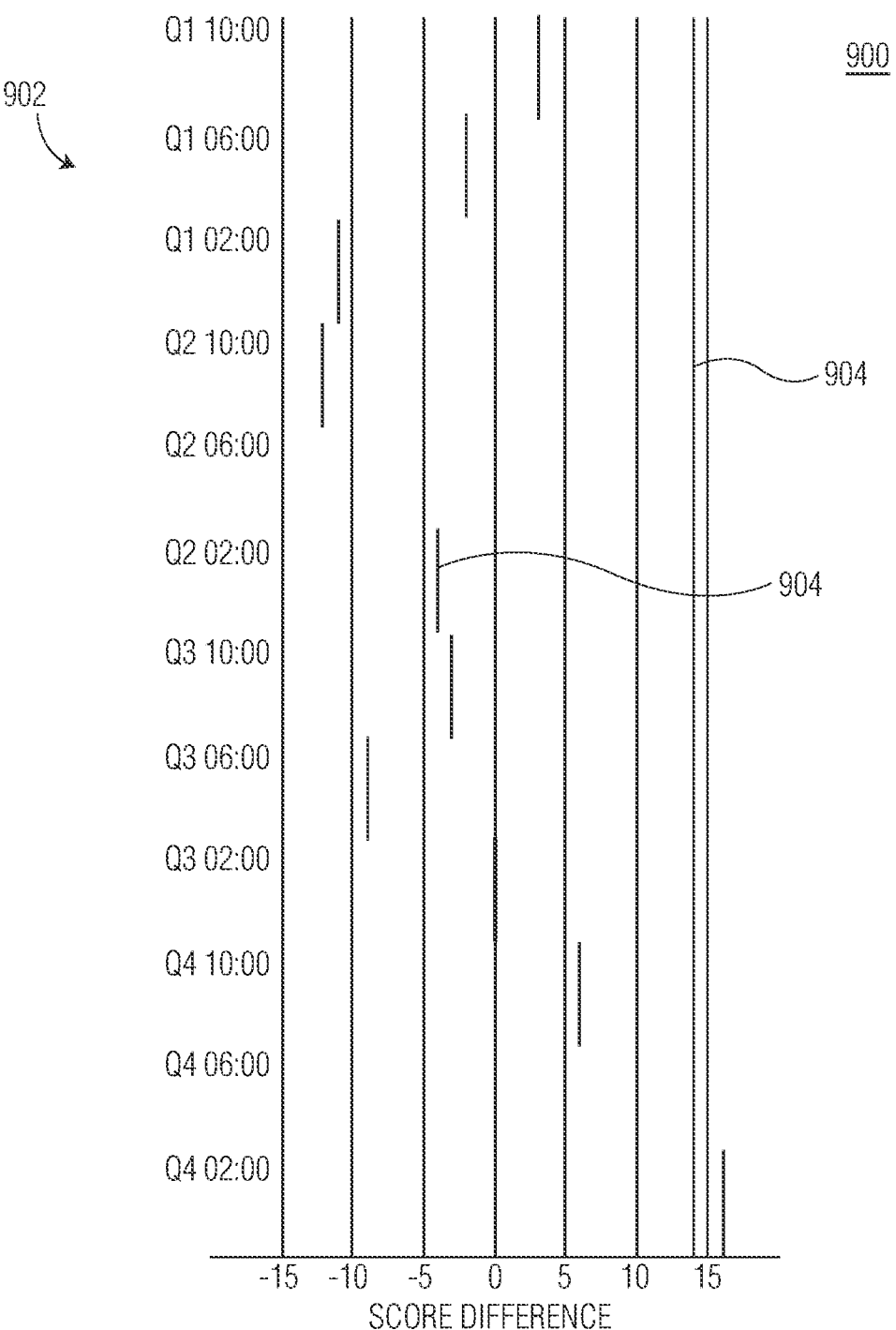
FIG. 9 is a block diagram illustrating an exemplary graphical user interface, according to example embodiments.

FIG. 9 is a block diagram illustrating a graphical user interface (GUI) 900, according to example embodiments. GUI 900 may be generated by interface module 206. In some embodiments, GUI 900 may be made available to one or more end users through application 126. In some embodiments, match prediction agent 120 may transmit GUI 900 to one or more client devices 106, via application 126, such that each client device 106 may render and display GUI 900.

GUI 900 may include graph 902. Graph 902 may depict a plot $Q_t(s=S_{t_f})$ for twelve different game times, t. As illustrated, t may plotted along the y-axis and the predicted score difference may be plotted along the x-axis. As illustrated, the predictions generated by in-match module 204 may be multi-modal, mirroring the myriad possible outcomes a game may have. As illustrated, initial predictions maybe matchup specific. As further illustrated, as the match progresses and the match state changes (i.e., one or more lines 904), the model distributions may evolve as well, often showing state switching and mean shifting over time. As such, the evolution of $Q_t(s=S_{t_f})$ may be context and matchup specific. The one or more predictions may oscillate between two initial states as the score difference oscillates. The actual score may be represented by solid line 906.

As shown, the distributions may not collapse or narrow with time. The apparent insensitivity of the distribution variance to game time may be a function of the Markovian nature of the current prediction architecture. The one or more models implemented by in-match module 204 may not have a sense of how much time remains in a match, only that some amount of time has passed.

FIG. 10 is a flow diagram illustrating a method 1000 of generating an in-match predicted score of a match using the prediction model generated in FIG. 8, according to example embodiments. Method 1000 may begin at step 1002.

At step 1002, in-match module 204 may receive, from event data. For example, in-match module 204 may receive, from tracking system 102, in real-time, near real-time, or periodically one or more sets of event data of a match currently in progress. An another example, in-match module 204 may receive, from one or more computing systems, in real-time, near real-time, or periodically one or more sets of event data derived from an entity associated with organization computing system 104. Such event data may include one or more features of match play (e.g., play-by-play events). Although method 1000 discusses use of live (or near-live) data, those skilled in the art understand that such operations may be performed with historical data.

At step 1004, in-match module 204 may receive a request from a client device 106 to generate a predicted score for the match at a certain time, t, such as, but not limited to, predicting a final score of the match at each time, t, during the match. For example, in-match module 204 may receive the request from client device 106 via application 126 executing thereon. Although method 1000 includes operation 1004, those skilled in the art may understand that in-match module 204 need not wait for an explicit request from an end-user to generate a predicted score of a match; rather, in-match module 204 may dynamically generate one or more predicted scores on-demand, as the match progresses.

At step 1006, in-match module 204 may construct a first vector representing team-specific statistics. In-match module 204 may generate the first vector by parsing the event data, and identifying those sets of information that are directed to team metrics. For example, in-match module 204 may construct a first vector, $X_t$, that includes each team's box score up to time t. Each team's box score may include, but is not limited to, team assists, team fouls, team rebounds (e.g., offensive, defensive, and total), team steals, and team turnovers.

At step 1008, in-match module 204 may construct a second vector representing player specific statistics. In-match module 204 may generate the second vector by parsing the event data received to identify one or more agents in each team's lineup. In-match module 204 may retrieve from data store 118 one or more agent-specific statistics associated with each agent. In-match module 204 may construct a second vector, $L_t$, which may represent each team's pre-game lineup for each game. For example, a lineup vector for each game $$\left(L_{i=(H|A)}^{j=(0\ldots n)}\right)$$

may be constructed for each player (j) on each team (i) and includes player identity, starter and availability flags, season to date games played, games started, minutes played, plus-minus, minutes per game, plus-minus per game, fouls per game, and the like. Team lineups may be formed from the union of n-such vectors, with padding of empty vectors (e.g., zeros) for rosters of less than n-players. $L_t$ may be the concatenation of home and away lineups.

At step 1010, in match-module 204 may construct a third vector representing all play-by-play events up to time, t. For example, in-match module 204 may generate a third vector, $P_t$, which includes one or more play-by-play events that may be described by game time, ball possession, and score differences, representing the base feature set. In some embodiments, the base feature set may be enhanced by the inclusion of home and away team identity, as well as event code (i.e., $P_t^+$).

At step 1012, in-match module 204 may identify one or more agents currently in the match (e.g., one or more agents currently on the court). In some embodiments, in-match module 204 may identify one or more agents currently in the match by parsing the play-by-play events up to time, t. In some embodiments, in-match module 204 may predict which agents are currently in the match utilizing trained neural network 220 to predict the one or more players currently in the match. For example, neural network 220 may predict which players are on the court (e.g., $O_t$) at time, t, given the lineup features $L_t$, current game state $P_t$, and box score $X_t$. The output from neural network 220 may be the vector, $O_t$, that represents the one or more agents in the match, for both teams, at each time, t.

At step 1014, in-match module 204 may generated a predicted outcome of the match. For example, in-match module 204 may generate a predicted final score based on the information generated at time, t. In-match module 204 may provide, as input, to trained mixture density network 224 $L_t$, $X_t$, $O_t$, and $P_t$. The output from mixture density network 224 may be one or more sets of score differentials during each time, t, of each match.

Figures 11A, 11B:
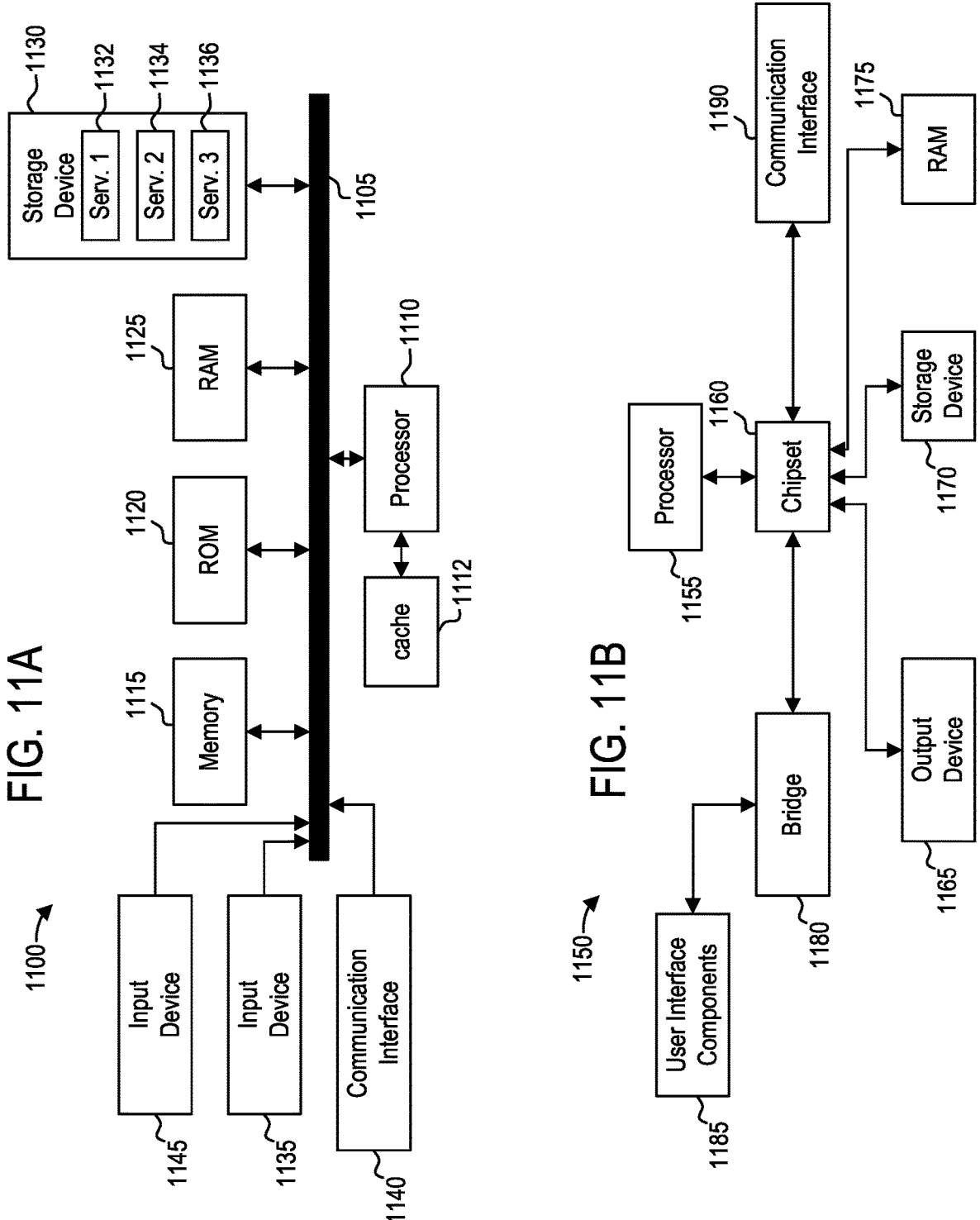
FIG. 11A is a block diagram illustrating a computing device, according to example embodiments.
FIG. 11B is a block diagram illustrating a computing device, according to example embodiments.

FIG. 11A illustrates a system bus computing system architecture 1100, according to example embodiments. System 1100 may be representative of at least a portion of organization computing system 104. One or more components of system 1100 may be in electrical communication with each other using a bus 1105. System 1100 may include a processing unit (CPU or processor) 1110 and a system bus 1105 that couples various system components including the system memory 1115, such as read only memory (ROM) 1120 and random access memory (RAM) 1125, to processor 1110. System 1100 may include a cache of high-speed memory connected directly with, in close proximity to, or integrated as part of processor 1110. System 1100 may copy data from memory 1115 and/or storage device 1130 to cache 1112 for quick access by processor 1110. In this way, cache 1112 may provide a performance boost that avoids processor 1110 delays while waiting for data. These and other modules may control or be configured to control processor 1110 to perform various actions. Other system memory 1115 may be available for use as well. Memory 1115 may include multiple different types of memory with different performance characteristics. Processor 1110 may include any general purpose processor and a hardware module or software module, such as service 1 1132, service 2 1134, and service 3 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 may represent any number of input mechanisms, such as a microphone for speech, a touch-sensitive screen for gesture or graphical input, keyboard, mouse, motion input, speech and so forth. An output device 1135 may also be one or more of a number of output mechanisms known to those of skill in the art. In some instances, multimodal systems may enable a user to provide multiple types of input to communicate with computing device 1100. Communications interface 1140 may generally govern and manage the user input and system output. There is no restriction on operating on any particular hardware arrangement and therefore the basic features here may easily be substituted for improved hardware or firmware arrangements as they are developed.

Storage device 1130 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1125, read only memory (ROM) 1120, and hybrids thereof.

Storage device 1130 may include services 1132, 1134, and 1136 for controlling the processor 1110. Other hardware or software modules are contemplated. Storage device 1130 may be connected to system bus 1105. In one aspect, a hardware module that performs a particular function may include the software component stored in a computer-readable medium in connection with the necessary hardware components, such as processor 1110, bus 1105, display 1135, and so forth, to carry out the function.

FIG. 11B illustrates a computer system 1150 having a chipset architecture that may represent at least a portion of organization computing system 104. Computer system 1150 may be an example of computer hardware, software, and firmware that may be used to implement the disclosed technology. System 1150 may include a processor 1155, representative of any number of physically and/or logically distinct resources capable of executing software, firmware, and hardware configured to perform identified computations. Processor 1155 may communicate with a chipset 1160 that may control input to and output from processor 1155. In this example, chipset 1160 outputs information to output 1165, such as a display, and may read and write information to storage device 1170, which may include magnetic media, and solid state media, for example. Chipset 1160 may also read data from and write data to RAM 1175. A bridge 1180 for interfacing with a variety of user interface components 1185 may be provided for interfacing with chipset 1160. Such user interface components 1185 may include a keyboard, a microphone, touch detection and processing circuitry, a pointing device, such as a mouse, and so on. In general, inputs to system 1150 may come from any of a variety of sources, machine generated and/or human generated.

Chipset 1160 may also interface with one or more communication interfaces 1190 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1155 analyzing data stored in storage 1170 or 1175. Further, the machine may receive inputs from a user through user interface components 1185 and execute appropriate functions, such as browsing functions by interpreting these inputs using processor 1155.

It may be appreciated that example systems 1100 and 1150 may have more than one processor 1110 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating an outcome for a sporting event, comprising:

receiving, by a computing system, lineup information for a sporting event, the lineup information comprising a first lineup comprising a first plurality of players for a home team and a second lineup comprising a second plurality of players for an away team;

identifying, by the computing system, first team embeddings corresponding to the home team and first player-specific embeddings corresponding to the first plurality of players in the first lineup, the first team embeddings and the first player-specific embeddings having a lower dimension than the lineup information;

identifying, by the computing system, second team embeddings corresponding to the away team and second player-specific embeddings corresponding to the second plurality of players in the second lineup, the second team embeddings and the second player-specific embeddings having the lower dimension than the lineup information;

determining, by the computing system, a current context of the sporting event, the current context comprising a current score and a current time remaining; and generating, by the computing system via a predictive model, a predicted outcome of the sporting event based on the current context of the sporting event, the first team embeddings, the first player-specific embeddings, the second team embeddings, and the second player-specific embeddings.

2. The method of claim 1, further comprising:

generating, by the computing system, a first graphical user interface comprising the first plurality of players for the home team; and receiving, by the computing system via the first graphical user interface, a user input substituting a first player of the first plurality of players for the home team for a second player of the first plurality of players for the home team.

3. The method of claim 2, further comprising:

updating, by the computing system, the first player-specific embeddings by substituting existing player embeddings corresponding to the first player with new player embeddings corresponding to the second player; and generating, by the computing system via the predictive model, an updated predicted outcome of the sporting event based on the current context of the sporting event, the first team embeddings, the updated first player-specific embeddings, the second team embeddings, and the second player-specific embeddings.

4. The method of claim 1, further comprising:

determining, by the computing system, that the current context of the sporting event comprises a current time remaining that is less than a total length of the sporting event; and based on the determining, projecting, by the computing system, a current lineup for the home team and the away team based on the first lineup of the home team and the second lineup of the away team.

5. The method of claim 4, further comprising:

generating, by the computing system via the predictive model, an updated predicted outcome of the sporting event based on the current context of the sporting event, the first team embeddings, updated first player-specific embeddings based on the projected current lineup for the home team, the second team embeddings, and updated second player-specific embeddings based on the projected current lineup for the away team.

6. The method of claim 1, further comprising:

generating, by the computing system, a graphical user interface comprising a graphical representation of the predicted outcome.

7. The method of claim 1, wherein the current time remaining is a total length of the sporting event and the first lineup for the home team and the second lineup for the away team are starting lineups for the home team and the away team.

8. The method of claim 1, where the current context of the sporting event further includes an injury corresponding to at least one of the first plurality of players or at least one of the second plurality of players.

9. A non-transitory computer readable medium comprising one or more sequences of instructions, which, when executed by a processor, causes a computing system to perform operations comprising:

receiving, by the computing system, lineup information for a sporting event, the lineup information comprising a first lineup comprising a first plurality of players for a home team and a second lineup comprising a second plurality of players for an away team;

identifying, by the computing system, first team embeddings corresponding to the home team and first player-specific embeddings corresponding to the first plurality of players in the first lineup, the first team embeddings and the first player-specific embeddings having a lower dimension than the lineup information;

identifying, by the computing system, second team embeddings corresponding to the away team and second player-specific embeddings corresponding to the second plurality of players in the second lineup, the second team embeddings and the second player-specific embeddings having the lower dimension than the lineup information;

determining, by the computing system, a current context of the sporting event, the current context comprising a current score and a current time remaining; and generating, by the computing system via a predictive model, a predicted outcome of the sporting event based on the current context of the sporting event, the first team embeddings, the first player-specific embeddings, the second team embeddings, and the second player-specific embeddings.

10. The non-transitory computer readable medium of claim 9, further comprising:

generating, by the computing system, a first graphical user interface comprising the first plurality of players for the home team; and receiving, by the computing system via the first graphical user interface, a user input substituting a first player of the first plurality of players for the home team for a second player of the first plurality of players for the home team.

11. The non-transitory computer readable medium of claim 10, further comprising:

updating, by the computing system, the first player-specific embeddings by substituting existing player embeddings corresponding to the first player with new player embeddings corresponding to the second player; and generating, by the computing system via the predictive model, an updated predicted outcome of the sporting event based on the current context of the sporting event, the first team embeddings, the updated first player-specific embeddings, the second team embeddings, and the second player-specific embeddings.

12. The non-transitory computer readable medium of claim 9, further comprising:

determining, by the computing system, that the current context of the sporting event comprises a current time remaining that is less than a total length of the sporting event; and based on the determining, projecting, by the computing system, a current lineup for the home team and the away team based on the first lineup of the home team and the second lineup of the away team.

13. The non-transitory computer readable medium of claim 12, further comprising:

generating, by the computing system via the predictive model, an updated predicted outcome of the sporting event based on the current context of the sporting event, the first team embeddings, updated first player-specific embeddings based on the projected current lineup for the home team, the second team embeddings, and updated second player-specific embeddings based on the projected current lineup for the away team.

14. The non-transitory computer readable medium of claim 9, further comprising:

generating, by the computing system, a graphical user interface comprising a graphical representation of the predicted outcome.

15. The non-transitory computer readable medium of claim 9, wherein the current time remaining is a total length of the sporting event and the first lineup for the home team and the second lineup for the away team are starting lineups for the home team and the away team.

16. A system comprising:

a processor; and a memory having programming instructions stored thereon, which, when executed by the processor, causes the system to perform operations comprising:

receiving lineup information for a sporting event, the lineup information comprising a first lineup comprising a first plurality of players for a home team and a second lineup comprising a second plurality of players for an away team;

identifying first team embeddings corresponding to the home team and first player-specific embeddings corresponding to the first plurality of players in the first lineup, the first team embeddings and the first player-specific embeddings having a lower dimension than the lineup information;

identifying second team embeddings corresponding to the away team and second player-specific embeddings corresponding to the second plurality of players in the second lineup, the second team embeddings and the second player-specific embeddings having the lower dimension than the lineup information;

determining a current context of the sporting event, the current context comprising a current score and a current time remaining; and generating, via a predictive model, a predicted outcome of the sporting event based on the current context of the sporting event, the first team embeddings, the first player-specific embeddings, the second team embeddings, and the second player-specific embeddings.

17. The system of claim 16, wherein the operations further comprise:

generating a first graphical user interface comprising the first plurality of players for the home team; and receiving, via the first graphical user interface, a user input substituting a first player of the first plurality of players for the home team for a second player of the first plurality of players for the home team.

18. The system of claim 17, wherein the operations further comprise:

updating the first player-specific embeddings by substituting existing player embeddings corresponding to the first player with new player embeddings corresponding to the second player; and generating, via the predictive model, an updated predicted outcome of the sporting event based on the current context of the sporting event, the first team embeddings, the updated first player-specific embeddings, the second team embeddings, and the second player-specific embeddings.

19. The system of claim 16, wherein the operations further comprise:

determining that the current context of the sporting event comprises a current time remaining that is less than a total length of the sporting event; and based on the determining, projecting a current lineup for the home team and the away team based on the first lineup of the home team and the second lineup of the away team.

20. The system of claim 19, wherein the operations further comprise:

generating, via the predictive model, an updated predicted outcome of the sporting event based on the current context of the sporting event, the first team embeddings, updated first player-specific embeddings based on the projected current lineup for the home team, the second team embeddings, and updated second player-specific embeddings based on the projected current lineup for the away team.

* * * * *